US012632681B2

(12) United States Patent
Blank et al.

(10) Patent No.: US 12,632,681 B2
(45) Date of Patent: May 19, 2026

(54) METHOD AND APPARATUS VERIFYING RFID TO RETAILER

(71) Applicant: Engineered Products of Ohio, LLC, Cortland, OH (US)

(72) Inventors: Brian Keith Blank, Cortland, OH (US); Christopher Scott Williams, San Diego, CA (US)

(73) Assignee: Engineered Products of Ohio, LLC, Cortland, OH (US)

( * ) Notice: Subject to any disclaimer, the term of this patent is extended or adjusted under 35 U.S.C. 154(b) by 0 days.

(21) Appl. No.: 18/680,021

(22) Filed: May 31, 2024

(65) Prior Publication Data

US 2025/0371295 A1      Dec. 4, 2025

(51) Int. Cl.
*G06K 7/10* (2006.01)

(52) U.S. Cl.
CPC ................................ *G06K 7/10366* (2013.01)

(58) Field of Classification Search
CPC .................................................. G06K 7/10366
See application file for complete search history.

(56) References Cited

U.S. PATENT DOCUMENTS

| | | | |
|---|---|---|---|
| 8,041,369 B2 | 10/2011 | Smith et al. | |
| 8,120,467 B2 | 2/2012 | Ehrman et al. | |
| 9,317,730 B1 | 4/2016 | Stokes | |
| 10,460,224 B1 | 10/2019 | Asthana | |
| 10,572,702 B2 | 2/2020 | Grimaux | |
| 11,797,783 B2 | 10/2023 | Blank et al. | |
| 2003/0001018 A1 | 1/2003 | Hussey | |
| 2007/0052521 A1 | 3/2007 | Beedles et al. | |
| 2007/0188328 A1 | 8/2007 | Mochizuki | |
| 2008/0297323 A1 | 12/2008 | Barkan | |
| 2009/0251319 A1* | 10/2009 | Ichikawa | G06Q 10/087 |
| | | | 340/572.1 |
| 2014/0203071 A1 | 7/2014 | Eggert | |
| 2021/0350091 A1 | 11/2021 | Blank et al. | |
| 2025/0030146 A1 | 1/2025 | Godawarthy | |

* cited by examiner

*Primary Examiner* — Jamara A Franklin
(74) *Attorney, Agent, or Firm* — Sand, Sebolt & Wernow Co., LPA

(57) ABSTRACT

A system and method of verifying a plurality of articles of manufacture are provided with RFID tags and/or barcode labels and that any applied RFID tag and/or barcode label is encoded with correct information about the article and/or a manufacturer thereof. An automatic calibration process is also disclosed. The system includes a reader; a trigger mechanism coupled with the reader; a controller coupled with the trigger mechanism and the reader; a memory coupled with the controller, said memory having stored therein a database of information concerning articles of manufacture; programming provided in the controller, said programming configured to control the trigger mechanism and the reader; wherein the reader is operable to interrogate an article that comes into a field of view of the trigger mechanism; and wherein the programming is configured to determine if an RFID tag and/or a barcode is applied to the article based on the interrogation.

11 Claims, 14 Drawing Sheets

METHOD AND APPARATUS VERIFYING RFID TO RETAILER

TECHNICAL FIELD

This disclosure is directed to systems in which Radio Frequency Identification (RFID) tags and barcode labels are utilized. In particular, the present disclosure is directed to a system which is able to be automatically calibrated and is useful for verifying that an RFID tag and/or a barcode label has been applied to a product and that any RFID tag and/or barcode label applied to a product is viable. The disclosed system is furthermore capable of providing verification to a retailer that all products shipped to them include correct and operational RFID tags and/or barcode labels.

BACKGROUND ART

Radio Frequency Identification (RFID) tags are essentially smart labels which are applied to a range of products to allow different parties to track the products through the supply chain. The RFID tags are specially configured to electronically store information relevant to the manufacturer of a product, to companies involved in the shipping of the product, and to end retailers. The tags may be encoded with different information about the product, ranging from a description of the product, the name of the manufacturer, the date of manufacture, any serial and model numbers relating to the product, expiry date, etc. RFID tags are designed to read by a dedicated RFID reader using radio frequency. Barcode labels are similarly applied to products to store relevant information.

Because RFID tags include so much information and are suitable for tracking goods through the supply chain, it is vitally important that each individual product to be shipped is labeled with an RFID tag (and/or barcode label) and that the correct RFID tag (and/or barcode label) is applied to each individual product. If a product leaves the manufacturer or shipping company without an RFID tag or barcode label applied thereto or with an incorrect RFID tag and or barcode label applied thereto, this can cause issues in the supply chain.

More and more end retailers are demanding that products delivered to them be correctly labeled with viable RFID tags and/or barcode labels. The term "viable" is used to denote that the RFID tag and/or barcode labels is not only applied to the product or article but also is encoded with correct information about the product or article and/or manufacturer or supplier thereof, and that the RFID tag and/or barcode label is machine readable.

SUMMARY OF THE INVENTION

The present disclosure relates to a system and method of verifying a plurality of articles of manufacture are provided with RFID tags and/or barcode labels and that any applied RFID tag and/or barcode label is encoded with correct information about the article and/or a manufacturer thereof. An automatic calibration process is also disclosed herein. The system includes a reader; a trigger mechanism coupled with the reader; a controller coupled with the trigger mechanism and the reader; a memory coupled with the controller, said memory having stored therein a database of information concerning articles of manufacture; programming provided in the controller, said programming configured to control the trigger mechanism and the reader; wherein the reader is operable to interrogate an article that comes into a field of view of the trigger mechanism; and wherein the programming is configured to determine if an RFID tag and/or a barcode is applied to the article based on the interrogation.

The verification system of the present disclosure is a self-contained compliancy station. In particular, the verification system is able to be used on high-speed product conveyor systems. The verification system enables manufacturers, suppliers, and shipping companies to prove to end retailers that each of their products had an operational and correct RFID tag and/or barcode label affixed thereto when the products departed their facility. In particular, the verification system enables verification that (a) the correct product has been shipped, (b) that an RFID tag and/or barcode label has been applied to each shipped product, and (c) that the RFID tag applied to each product is fully operational. The disclosed system provides four verification modes, namely, RFID only; barcode only; RFID and barcode; and multi-pack mode. Multi-pack mode is where a package contains a number of the same products with a single RFID tag and/or barcode affixed to the package. Each mode performs a different type of verification based on the end customer's requirements.

The verification system disclosed herein provides a robust, compact system that can be permanently installed on a conveying system in a facility of a manufacturer, a supplier, or a shipping company. Alternatively, the verification process may be a mobile system which can be moved from one area of a facility to another. The verification system is automatically calibrated in order to optimally interrogate and read RFID tags and barcode labels affixed to products. The verification system is furthermore used to ensure the viability of any RFID tags that are read, i.e., that the information encoded to the RFID tags corresponds to information stored in a database. Finally, the verification system is able to provide proof that the correct RFID-tagged and/or barcode labeled product is being shipped. The verification system is capable of performing up to about 800 tag and label scans per minute and provides in-line RFID tag and barcode label verification with visual and I/O conveyors integration.

In a first aspect, the disclosure provides an RFID verification system comprising a product verification system which includes a reader; a trigger mechanism coupled with the reader; a controller coupled with the trigger mechanism and the reader; a memory coupled with the controller, said memory having stored therein a database of information concerning articles of manufacture; programming provided in the controller, said programming configured to control the trigger mechanism and the reader; wherein the reader is operable to interrogate an article that comes into a field of view of the trigger mechanism; and wherein the programming is configured to determine if an RFID tag and/or barcode is applied to the article based on the interrogation. In this exemplary embodiment or another exemplary embodiment, the reader is an RFID reader which includes an RFID transmitter, and wherein the programming is further configured to automatically calibrate the RFID reader by setting a transmission power level of the RFID transmitter to a predetermined maximum power level. In this exemplary embodiment or another exemplary embodiment, the programming is further configured to verify that information encoded to the RFID tag and/or barcode applied to the article matches the database of information stored in the memory. In this exemplary embodiment or another exemplary embodiment, the reader is one of an RFID reader and a barcode reader. In this exemplary embodiment or another exemplary embodiment, the trigger mechanism is one of an RFID antenna, an optical sensor, a camera, and a counter. In this exemplary embodiment or another exemplary embodiment, the product verification system further comprises a user interface coupled to the controller, wherein the user interface is configured to enable an operator to initiate the interrogation of the article by the reader. In this exemplary embodiment or another exemplary embodiment, the product verification system further comprises a display screen provided on the user interface, wherein the display screen is configured to display one of a plurality of different colors thereon based on a result of the interrogation by the reader. In this exemplary embodiment or another exemplary embodiment, the programming is configured to generate a report of the interrogation by the reader.

In a second aspect, the disclosure provides a method of verifying an article for shipping, said method comprising passing the article through a field of view of a trigger mechanism; scanning the article in the field of view with a reader coupled to the trigger mechanism; and determining, with the reader, if an RFID tag and/or a barcode is applied to the article. In this exemplary embodiment or another exemplary embodiment, the method further comprises coupling a user interface with the RID reader; displaying a result on a display screen of the user interface if no RFID tag and/or no barcode is found on the article. In this exemplary embodiment or another exemplary embodiment, displaying the result comprises displaying a first color on the display screen. In this exemplary embodiment or another exemplary embodiment, the method further comprises coupling a controller with the trigger mechanism and the reader; storing a database of article information in a memory of the controller; locating an RFID tag and/or a barcode on the article passing through the field of view of the antenna; comparing information encoded to the located RFID tag and/or barcode with the database of article information stored in the memory. In this exemplary embodiment or another exemplary embodiment, the method further comprises coupling a user interface with the reader and the controller; displaying a first result on a display screen of the user interface if the information encoded to the located RFID tag and/or the located barcode matches the article information in the database; and displaying a second result on the display screen of the user interface if the information encoded to the located RFID tag and/or the located barcode fails to match the article information in the database. In this exemplary embodiment or another exemplary embodiment, displaying the first result comprises displaying a first color on the display screen and displaying the second result comprises displaying a second color on the display screen, where the second color is different from the first color. In this exemplary embodiment or another exemplary embodiment, the method further comprises moving a plurality of articles to be shipped to a supplier along a conveyor; positioning the trigger mechanism and the reader adjacent the conveyor; coupling the trigger mechanism and the reader with a controller; scanning the plurality of articles as they move along the conveyor to determine that each article of the plurality of articles includes an RFID tag and/or a barcode; verifying whether every located RFID tag and/or barcode includes encoded information that matches a database of article information stored in a memory of the controller; and displaying a result of the scanning database matching on a display screen of a user interface coupled with the controller. In this exemplary embodiment or another exemplary embodiment, the method further comprises calibrating the reader prior to scanning the plurality of articles. In this exemplary embodiment or another exemplary embodiment, the method further comprises halting movement of the conveyor via the controller if one article of the plurality of articles is missing an RFID tag and/or a barcode; and removing the one article from the conveyor. In this exemplary embodiment or another exemplary embodiment, method further comprises halting movement of the conveyor via the controller if one article of the plurality of articles includes an RFID tag and/or a barcode having encoded information thereon which does not match article information stored in the database of the memory of the controller; and removing the one article from the conveyor. In this exemplary embodiment or another exemplary embodiment, the method further comprises producing a verification report of the scanned plurality of articles.

In yet another aspect, the disclosure provides a method of calibrating an RFID reader comprising providing an RFID verification system including the RFID reader, an RFID antenna, and a user interface, all coupled to a controller having a memory and programming configured to calibrate the RFID reader; providing an RFID tag with article information encoded thereon; placing the RFID tag in a field of view of the RFID antenna; interrogating the RFID tag with the RFID reader; pressing a calibration button on the user interface; and calibrating the RFID reader.

In this exemplary embodiment or another exemplary embodiment, after pressing the calibration button, the calibration of the RFID reader occurs automatically. In this exemplary embodiment or another exemplary embodiment, the calibration of the RFID reader includes setting a transmission power level of an RFID transmitter of the RFID reader to a maximum transmission (TX) power level. In this exemplary embodiment or another exemplary embodiment, the calibration of the RFID reader further includes setting a receiving power level of an RFID receiver of the RFID reader to a maximum receiving (RX) power level. In this exemplary embodiment or another exemplary embodiment, setting the transmission power level of the RFID transmitter includes determining whether a signal from the interrogated RFID tag is received by an RFID receiver of the RFID reader. In this exemplary embodiment or another exemplary embodiment, when the signal is not received by the RFID receiver, set the maximum power level as a maximum calibration transmission power level. In this exemplary embodiment or another exemplary embodiment, when the signal is received by the RFID receiver, record a Received Signal Strength Indicator (RSSI) in the memory of the controller. In this exemplary embodiment or another exemplary embodiment, the method further comprises reducing the transmission power level by an increment. In this exemplary embodiment or another exemplary embodiment, the method further comprises (a) repeating the interrogation of the RFID tag; (b) determining whether the signal from the interrogated RFID tag is received by the RFID receiver of the RFID reader; (c) recording the RSSI when the signal is received; (d) reducing the transmission power level by the increment; and repeating steps (a) through (d) until no signal is received from the interrogated RFID tag. In this exemplary embodiment or another exemplary embodiment, when no signal is received in step e), the method further comprises increasing the transmission power level by one increment. In this exemplary embodiment or another exemplary embodiment, the method further comprises setting the transmission power level as an optimal calibrated transmission power level. In this exemplary embodiment or another exemplary embodiment, the method further comprises setting a receiving power level of the RFID receiver to a predetermined maximum power level. In this exemplary embodiment or another exemplary embodiment, the method further comprises interrogating the RFID tag. In this exemplary embodiment or another exemplary embodiment, the method further comprises determining whether the RFID receiver receives a signal is received from the interrogated RFID tag. In this exemplary embodiment or another exemplary embodiment, when the signal is not received by the RFID receiver, the method further comprises recording the predetermined maximum receiving power level as the maximum receiving power level in the memory of the controller. In this exemplary embodiment or another exemplary embodiment, when the signal is received, the method further comprises decreasing the receiving power level by one increment. In this exemplary embodiment or another exemplary embodiment, the method further comprises (a) interrogating the RFID tag; (b) determining whether the signal is received by the RFID receiver; (c) wherein when the signal is received, decreasing the receiving power level by the one increment; and repeating steps (a) through (c) until no signal is received. In this exemplary embodiment or another exemplary embodiment, wherein when no signal is received, increasing the receiving power level by the one increment and recording the increased receiving power level as an optimal receiving power level. In this exemplary embodiment or another exemplary embodiment, the method further comprises populating the optimal transmission power level in a configuration screen of the user interface. In this exemplary embodiment or another exemplary embodiment, the method further comprises populating the optimal receiving power level in a configuration screen of the user interface.

In yet another aspect, the disclosure provides a method of verifying an RFID tag, comprising providing an RFID reader; providing a plurality of RFID tags each affixed to one of a plurality of articles; interrogating a first RFID tag affixed to a first article; interrogating a second RFID tag affixed to a second article; and determining whether the first RFID tag and the second RFID tag are the same as one another or are different to one another. In this exemplary embodiment or another exemplary embodiment, the method further comprises recording results of the determining whether the first RFID tag and the second RFID tag are the same or are different in a database stored in a memory of a product verification system. In this exemplary embodiment or another exemplary embodiment, when the first RFID tag and the second RFID tag are the same as one another, the method further comprises interrogating a further RFID tag affixed to a further article; determining whether the further RFID tag is the same as the first RFID tag and the second RFID tag or is different from the first RFID tag and the second RFID tag. In this exemplary embodiment or another exemplary embodiment, when the further RFID tag is different from the first RFID tag and the second RFID tag, removing the further article with the further RFID tag affixed thereto from the plurality of articles. In this exemplary embodiment or another exemplary embodiment, the method further comprises recording results of the determining whether the further RFID tag is the same as or is different to the first RFID tag and the second RFID tag in a database stored in a memory of a product verification system. In this exemplary embodiment or another exemplary embodiment, the method further comprises generating a verification report from the database. In this exemplary embodiment or another exemplary embodiment, when the first RFID tag and the second RFID tag are different from one another, the method further comprises displaying an indicator on a user interface of the product verification system. In this exemplary embodiment or another exemplary embodiment, the method further comprises stopping the interrogation and removing one of the first article and the second article from the plurality of articles. In this exemplary embodiment or another exemplary embodiment, the method further comprises generating a verification report when the RFID tags affixed to the plurality of articles are all the same.

In still another aspect, the disclosure provides a method of verifying whether a plurality of articles have correct RFID tags and/or barcode applied thereto comprising providing an article verification system including a reader, a trigger mechanism, a user interface and a controller having a memory and programming configured to perform a verification process; sequentially placing each article of the plurality of articles in a field of view of the trigger mechanism; and determining whether or not an RFID tag and/or a barcode are provided on each article of the plurality of articles. In this exemplary embodiment or another exemplary embodiment, the method further comprises storing results of determining whether or not each article is provided with an RFID tag and/or a barcode in a database in the memory of the article verification system. In this exemplary embodiment or another exemplary embodiment, when each article placed in the field of view of the trigger mechanism includes an RFID tag and/or a barcode, the method further comprises reading the RFID tag and/or barcode with the reader. In this exemplary embodiment or another exemplary embodiment, the method further comprises comparing information encoded to the RFID tag and/or barcode with information stored in the memory of the controller. In this exemplary embodiment or another exemplary embodiment, the method further comprises recording, in a database stored in the memory, whether or not the encoded information matches stored information. In this exemplary embodiment or another exemplary embodiment, the method further comprises generating, via programming provided in the memory, a verification report of whether or not the encoded information matches stored information. In this exemplary embodiment or another exemplary embodiment, the method further comprises shipping the plurality of articles with the verification report. In this exemplary embodiment or another exemplary embodiment, the method further comprises removing any article from the plurality of articles in which the encoded information on the RFID tag and or barcode applied to that article does not match the information stored in the memory. In this exemplary embodiment or another exemplary embodiment, the method further comprising generating, via programming provided in the memory, a verification report which includes a set of articles from the plurality of articles in which an RFID tag and/or barcode is applied thereto and in which encoded information on the applied RFID tag and/or barcode matches information stored in the memory of the controller. In this exemplary embodiment or another exemplary embodiment, the method further comprises shipping the set of articles to a customer company with the verification report.

In yet another aspect, the disclosure provides a method of verifying whether RFID tags and/or barcodes are viable, wherein the method comprises entering, into a user interface of an article verification system, information relating to a company and/or a product; storing the information in a database of a memory coupled to the user interface; reading, with a reader of the verification system, an RFID tag and/or barcode affixed to an article of a plurality of articles; and comparing information encoded to the read RFID tag and/or barcode with stored information relating to the company and/or product. In this exemplary embodiment or another exemplary embodiment, the method further comprises storing results of the reading of the RFID tag and/or barcode in a verification database. In this exemplary embodiment or another exemplary embodiment, the method further comprises storing results of failing to locate or read an RFID tag and/or barcode in the verification database. In this exemplary embodiment or another exemplary embodiment, the method further comprises storing results of failing to match encoded information with stored information relating to the company and/or the product. In this exemplary embodiment or another exemplary embodiment, the method further comprises shipping the plurality of articles to the company with the verification report.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
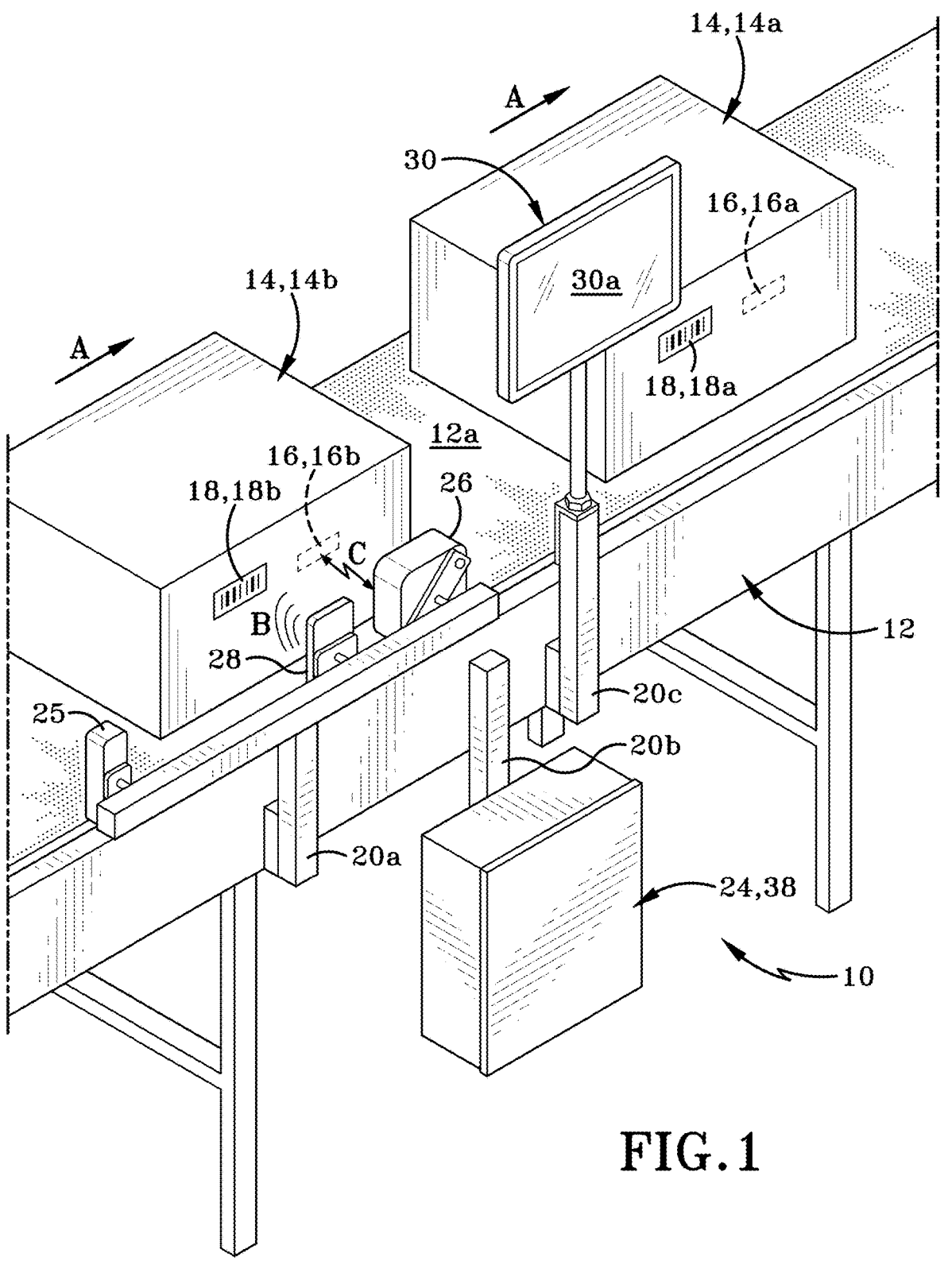
FIG. 1 is a top, front, left side perspective view of a first embodiment of a Radio Frequency Identification (RFID) and barcode label verification system in accordance with an aspect of the present disclosure.

Referring to FIG. 1, a first embodiment of a Radio Frequency Identification (RFID) tag and/or barcode label verification system in accordance with an aspect of the present disclosure is illustrated, generally indicated by reference character 10. The RFID tag and/or barcode label verification system 10 will be referred to hereinafter as "verification system 10" or "system 10".

Verification system 10 is illustrated in FIG. 1 as being permanently installed on a frame of a conveyor 12 via appropriate mounting brackets 20a, 20b, 20c. Conveyor 12 is used to move articles or products 14 therealong via a movable conveyor belt 12a. It should be understood that conveyor 12 is exemplary of any device or vehicle that holds, carries, and/or transports one or more articles or products thereon or therein. It should be noted that the terms "item," "article," "part," "product," "container," "articles of manufacture", "goods" and "merchandise" may be used interchangeably herein to denote anything to which an RFID tag 16 and/or a barcode label 18 is applied or within which an RFID tag 16 is embedded. It should further be noted that the terms "RFID tag" or "tag" may be used interchangeably herein to denote any RFID tag 16 affixed to or embedded within a product 14 or a product's packaging. The terms "barcode label", "barcode" or "label" may be used interchangeably herein to denote any type of machine-readable affixed to a product 14 including but not limited to UPC, QR, data matrix and EAN barcodes.

As will be described in greater detail later herein, the products 14 are moved along by conveyor 12, the verification system 10 scans each product 14 to determine, in a first exemplary task, if an RFID tag 16 and/or a barcode label 18 has been applied to each of the products 14. In the performance of the first exemplary task, system 10 scans a plurality of articles 14a, 14b moved along by conveyor 12 past system 10 in order to verify that each article 14a, 14b has an RFID tag (such as tags 16a, 16b, respectively) and/or barcode (such as barcodes 18a, 18b, respectively) applied thereto. The tags 16a, 16b and barcodes 18a, 18b may be affixed to an exterior surface of the associated article 14a, 14b. The tags 16a, 16b may, alternatively, be embedded within the interior of the packaging of the associated article 14a, 14b or within the associated articles 14a, 14b themselves.

A second exemplary task of system 10 is verification that the correct RFID tag 16a, 16b and/or barcode 18a, 18b has been applied to the correct article 14a, 14b.

A third exemplary task of system 10 is the generation of a verification report proving that each article 14a, 14b moved by conveyor 12 has an RFID tag 16a, 16b and/or barcode 18a, 18b applied thereto; that each applied RFID tag 16a, 16b is operational (i.e., can be read by an RFID reader), that each barcode 18a, 18b is operational (i.e., can be read by a barcode imager); and that the correct information is encoded to each RFID tag 16a, 18b and/or barcode 18a, 18b applied to the respective article 14a, 14b.

Referring still to FIG. 1 and in accordance with an aspect of the present disclosure, verification system 10 includes an electronics control box 24, an RFID antenna 26, a barcode imager 28, and a user interface 30. Electronics control box 24 will be described in greater detail hereafter.

RFID antenna 26 may be a fixed-mount Ultra High Frequency (UHF) antenna. One suitable type of RFID antenna 26 that may be used in system 10 is the TIMES-7® ultra-low profile A5020 antenna. (TIMES-7® is a registered trademark of TIMES-7 HOLDINGS LIMITED of Lower Hutt, New Zealand). The A5020 has a compact design that makes it particularly suitable for applications where there is a confined read zone. (A read zone or read range is an area of the field of view of the reader in which the reader is able to interrogate an article.) The A5020 is IP68 rated and has a beam-width of about 100°. Additionally, the A5020 is capable of operating at low-temperature extremes and is water and general cleaning agent resistant. It will be understood that more than one RFID antenna 26 may be provided as part of system 10, depending on the intended use thereof.

The barcode imager 28 is configured to be able to read 1-D and 2-D (QR-code) barcode labels. It will be understood that one or more barcode imagers 28 may be utilized in system 10, depending on the intended use of system 10.

User interface 30 preferably includes an industrial-grade open frame touch screen. The user interface 30 communicates through an HDMI port (not shown) and USB ports (not shown) for touch functions and external power. User interface may be used by an operator of system 10 to activate the system, enter various control parameters, and initiate generation of various reports as will be described hereafter.

During setup of system 10, RFID antenna 26 may be omitted if no RFID tags 16 are to be read as part of the verification process. Similarly, during setup of system 10, barcode imager 28 may be omitted if articles 14 are not provided with barcodes which need to be read as part of the verification process. Preferably, however, both the RFID antenna 26 and barcode imager 28 will be installed to ensure system 10 is ready to read any combination of tags 16 and labels 18 applied to articles 14.

Figure 1A:
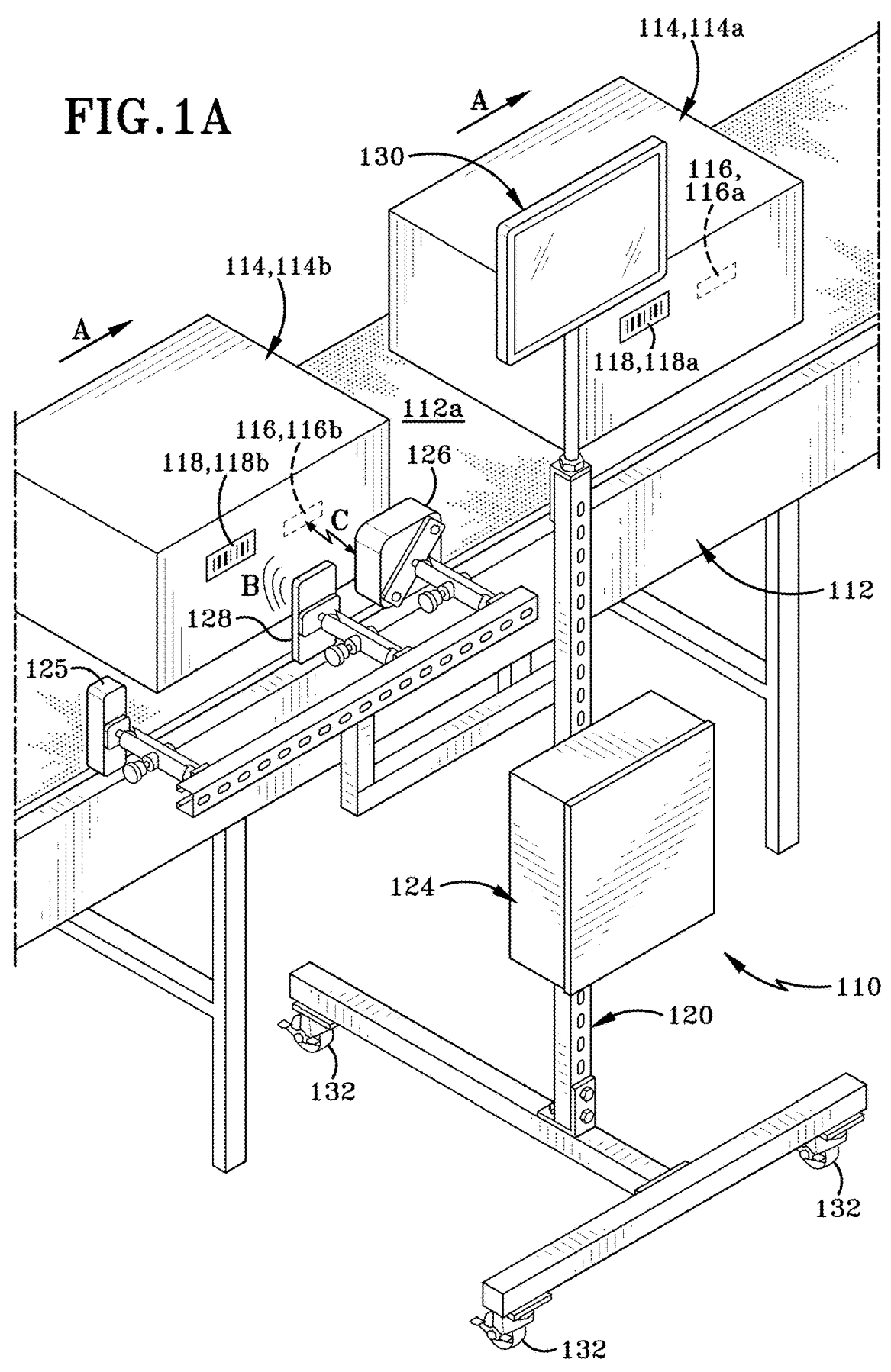
FIG. 1A is a top, front, left side perspective view of a second embodiment of the RFID tag and barcode label verification system in accordance with an aspect of the present disclosure.

FIG. 1A shows a second embodiment of an RFID verification system in accordance with an aspect of the present disclosure, generally indicated at 110. System 110 is substantially identical to system 10 as regards the various components of the system and how they are used. System 110 differs from system 10 in that instead of being permanently attached to the frame of conveyor 12, system 110 includes a mobile support frame 120 upon which is mounted an electronics control box 124, an photo eye 125, an RFID antenna 126, a barcode imager 128, and a user interface 130. Electronics control box 124 is identical in structure and function to electronics control box 24; RFID antenna 126 is identical in structure and function to RFID antenna 26; barcode imager 128 is identical in structure and function to barcode imager 28, and user interface 130 is identical in structure and function to user interface 30. Support frame 120 includes a plurality of wheels 132 which enable verification system 110 to be moved easily from one area of a facility (e.g. a factory floor) to another area thereof. In particular, the verification system 110 may be brought alongside a conveyor 112 which is to be used to move a plurality of articles 114 therealong. FIG. 1A shows articles 114a, 114b being moved by conveyor 112 in the direction "A". Article 114a includes an RFID tag 116a and barcode 118a. Article 114b includes an RFID tag 116b and a barcode 118b. System 110 is used in an identical manner to system 10 to verify that each article 114a, 114b includes an RFID tag 116 and/or barcode 118 and, if so, that all applied tags 116 and/or barcodes 118 are correct for the associated articles 114. In view of this the remaining description should be understood to apply equally to both the first embodiment and the second embodiment of system 10, 110 in accordance with the present disclosure.

Figure 2:
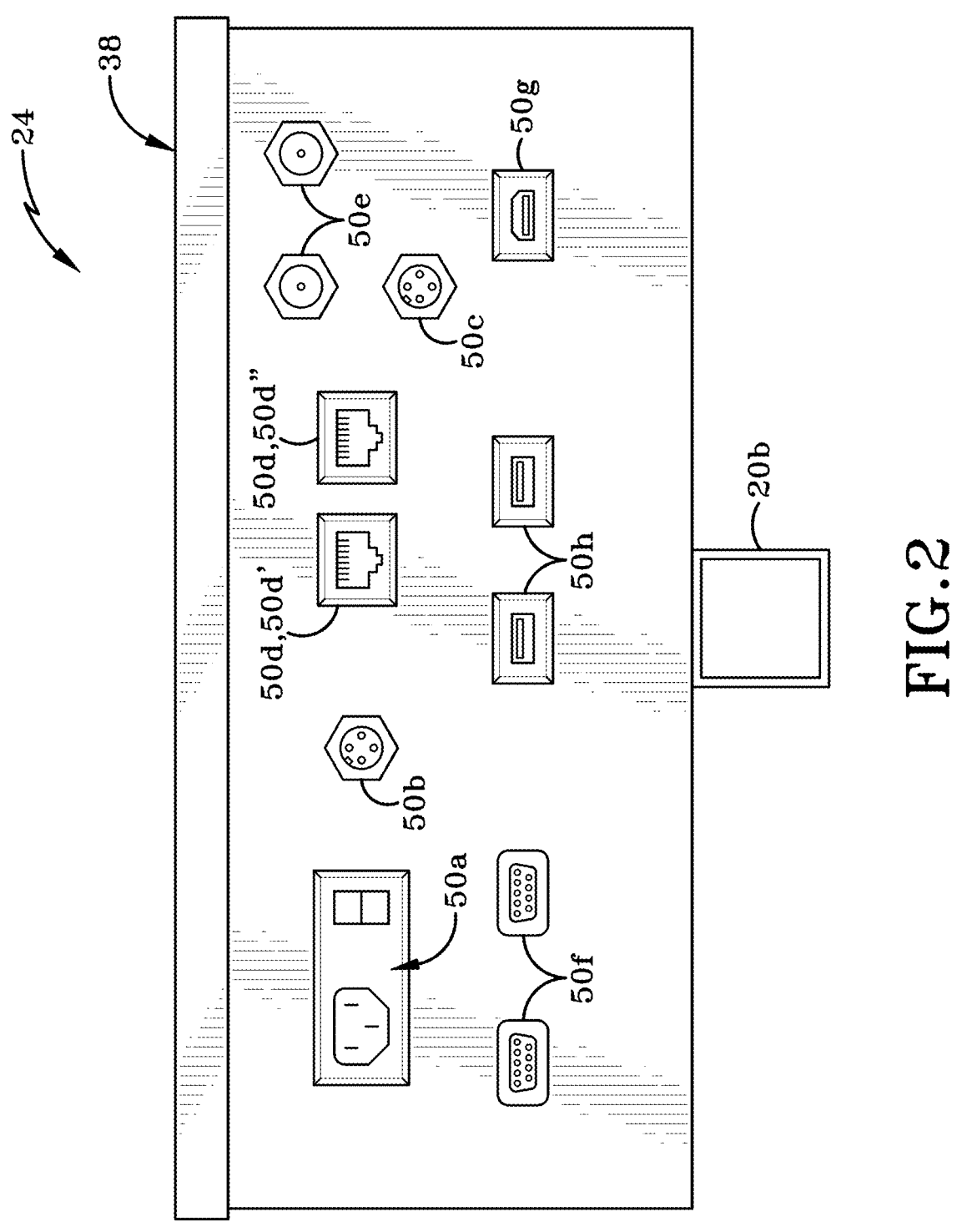
FIG. 2 is a bottom plan view of an electronics control box of the verification system in accordance with an aspect of the present disclosure.
Figure 3:
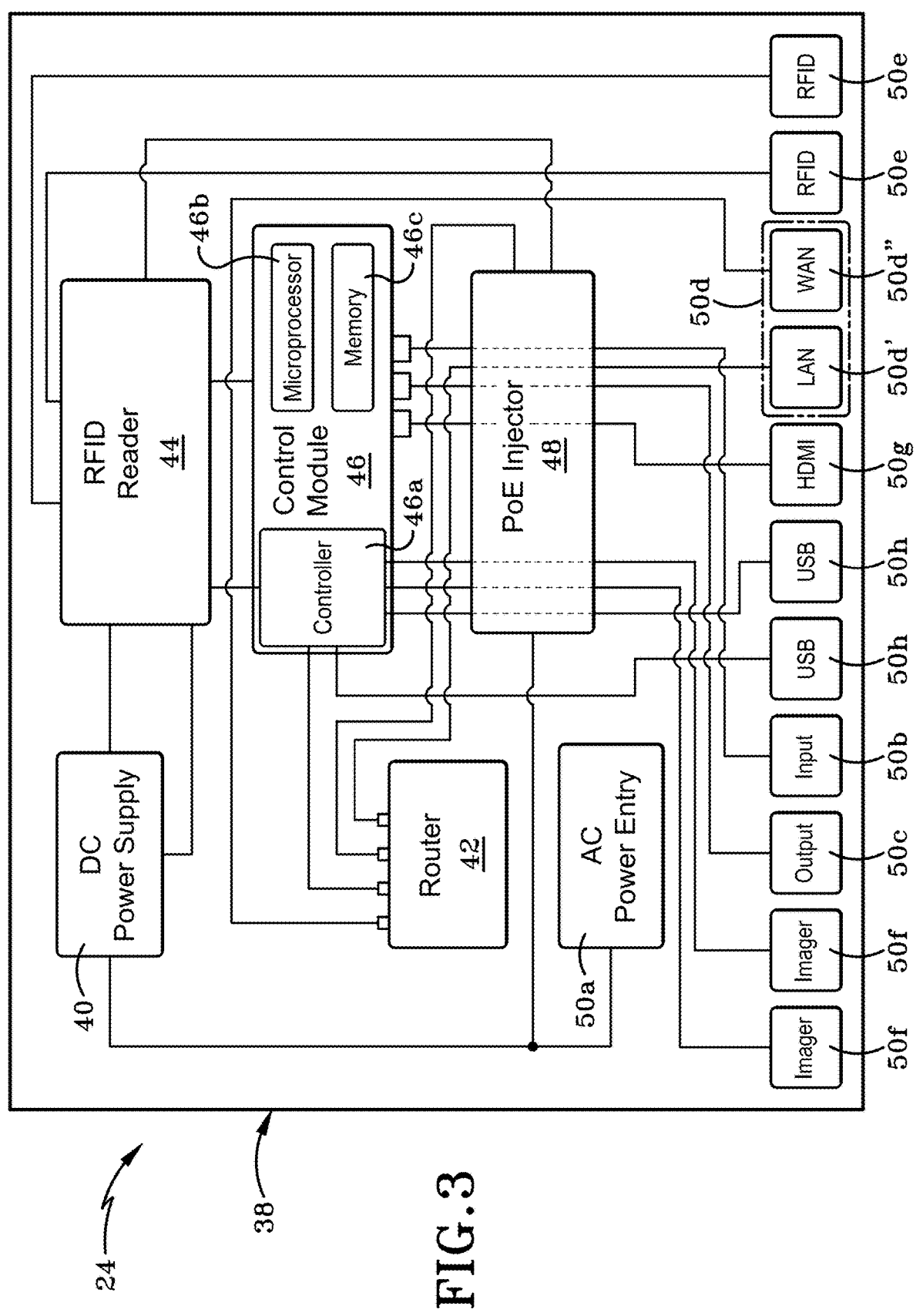
FIG. 3 is a diagrammatic view of the components and connectors of the electronics control box shown in FIG. 2.

Referring now to FIGS. 2 and 3, the electronics control box 24 and all components housed therein are described in greater detail hereafter. Control box 24 contains all the hardware required to run system 10. FIG. 2 shows control box 24 includes a housing 38 defining an interior compartment within which are housed a DC power supply 40, an edge router 42, at least one RFID reader 44, a control module 46, and a Power over Ethernet (POE) injector 48. The components within control box 24 are coupled to the components outside control box 24 via a plurality of ports and connectors provided on an exterior wall of housing 38 (FIG. 3). The ports and connectors include an AC Power Entry 50a (comprising an AC plug and a power switch), a product detect (input) 50b; a stop circuit (output) 50c; an ethernet pass through port 50d (comprising a LAN 50d' and a WAN 50d'' port); antenna ports 50e; two serial barcode imager ports 50f; a High Definition Multimedia Interface (HDMI) port 50g, and at least one Universal Serial Bus (USB) port 50h. All access to equipment within control box 24 is provided through the connectors 50a through 50h provided on the outside of electronics control box 24. There is therefore no need for an operator to open up the electronics control box 24 during regular use of system 10. It may be noted that when the end-user purchases verification system 10, all of the equipment shown in FIG. 3 and discussed above is already mounted on, or housed within, the interior compartment of control box 24 and is ready for use.

DC power supply 40 within control box 24 provides power to all components of system 10. DC power supply 40 may be a 24V Direct Current supply. Power supply 40 is operatively coupled to AC Power Entry 50a as shown in FIG. 3. The AC Power Entry 50a provides access to plug the control box 24 into a 110V outlet, should that be desired. The switch of the AC Power Entry 50a is a rocker ON/OFF switch accessible from the outside of control box 24 which enables an operator to actuate system 10 or to shut system 10 down.

Edge router 42 is the main network hub of system 10 which provides Internet Protocol (IP) addresses to all network devices of system 10 including but not limited to RFID reader 44 and to an embedded controller (not shown but located within housing 38 proximate control module 46).

RFID reader 44 preferably is a single-port or double-port Ultra High Frequency RFID reader (UHF RFID reader). RFID reader 44 includes an RFID transmitter and an RFID receiver as is known in the art. Alternatively, RFID reader 44 may include an RFID transceiver which acts as both an RFID transmitter and an RFID transceiver. One suitable RFID reader 44 for use in system 10 is a UHF R700 Impinj Fixed 4 Port Reader provided by Impinj, Inc. of Seattle, WA, USA. One or more RFID readers 44 may be provided in control box 24, as required by use of system 10. RFID antenna 26 is operatively linked to RFID reader 44 in any suitable manner such as via a coaxial cable (not shown) extending between RFID antenna 26 and one of the pass-through RFID antenna ports 50e provided on electronics control box 24.

Referring to FIG. 3, control module 46, i.e., a custom Printed Circuit Board (PCB) connects and directs all data, I/O controls (Input/Output controls), and acts as a mount for an embedded controller 46a, at least one microprocessor 46b, and a memory 46c. One suitable embedded controller is a Raspberry Pi referred to earlier herein. The Raspberry Pi is an industrial controller which runs a Linux Operating system. Linux is a free, open source operating system. I/O connectors on control module 46 provide a number of inputs and outputs for components such as photo or optical eyes 25 (FIG. 1), conveyor stops (not shown) and other sensors and devices which may be utilized by system 10. The photo eye 25 shown in FIG. 1 may act as a trigger for system 10 to start scanning products 14 moving along conveyor 12. Photo eye 25 may, for example, act as a trigger to cause barcode imager 28 to begin scanning products 14 to determine if a barcode 18 is present thereon. The input port 50b is wired to provide a trigger of an external photo eye (not shown) used to monitor conveyor 12. The output port 50c is wired for external access to plug in a conveyor stop that is triggered based on software conditions. Microprocessor 46b is provided with programming configured to operate verification system 10 and perform the first, second, and third exemplary tasks described herein.

At least one database concerning details about particular articles of manufacture is uploaded and stored in memory 46*c* of control module 46. The at least one database may include data or information about a manufacturer of particular articles or products which are to be verified using system 10. The at least one database may further include details of the actual products or articles of manufacture themselves including model numbers, serial numbers, item reference numbers and/or any other relevant information which system 10 may utilize in an operation to verify information encoded to RFID tags 16 and/or barcode labels 18 applied to the products themselves.

The Power over Ethernet (POE) injector 48 provides low voltage power to the verification system 10.

In summary, the electronics within control box 24, i.e., power supply 40, edge router 42, RFID reader 44, control module 46, and PoE inventor 48 are operatively coupled with the RFID antenna 26, barcode imager 28, and user interface 30 via the connection ports on control box 24. Additionally, components which are not illustrated in the figures may also be connected to the electronics within control box 24. For example, photo eyes (not shown) or any other type of product-detecting sensors or equipment may be operatively coupled to control module 46 via product detect input 50*b* (FIG. 2). Conveyor 12 may be operatively coupled to control module via Stop Circuits output 50*c*. Product Detect input 50*b* and Stop Circuits output 50*c* are used for failure mode to stop conveyor 12 if necessary during use of system 10. Ethernet Pass Through ports 50*d* (comprising a LAN 50*d'* and a WAN 50*d''* port) provide control module 46 access to an external network outside control box 24. RFID antenna 26 is operatively coupled with control module 46 via the RFID antenna ports 50*e*. Barcode imager 28 is operatively coupled with control module via the serial imager ports 50*f*. User interface 30 may be operatively coupled to control module 46 via HDMI port 50*g* and USB port 50*h*.

User interface 30 is used by an operator to set up and control a verification process of a plurality of articles 14 by system 10. As will be discussed in greater detail hereafter, user interface 30, when activated, displays several menus relating to the various settings, functions and configurations of verification system 10. The operator will engage the user interface 30 to activate the system 10, control the various tasks required to be performed by system 10, and will later deactivate the system 10 using user interface 30. User interface 30 includes a touchscreen 30*a* which is physically engaged by the operator. It will be understood, however, that any other suitable type of user interface 30 may be utilized as part of system 10.

Figure 4:
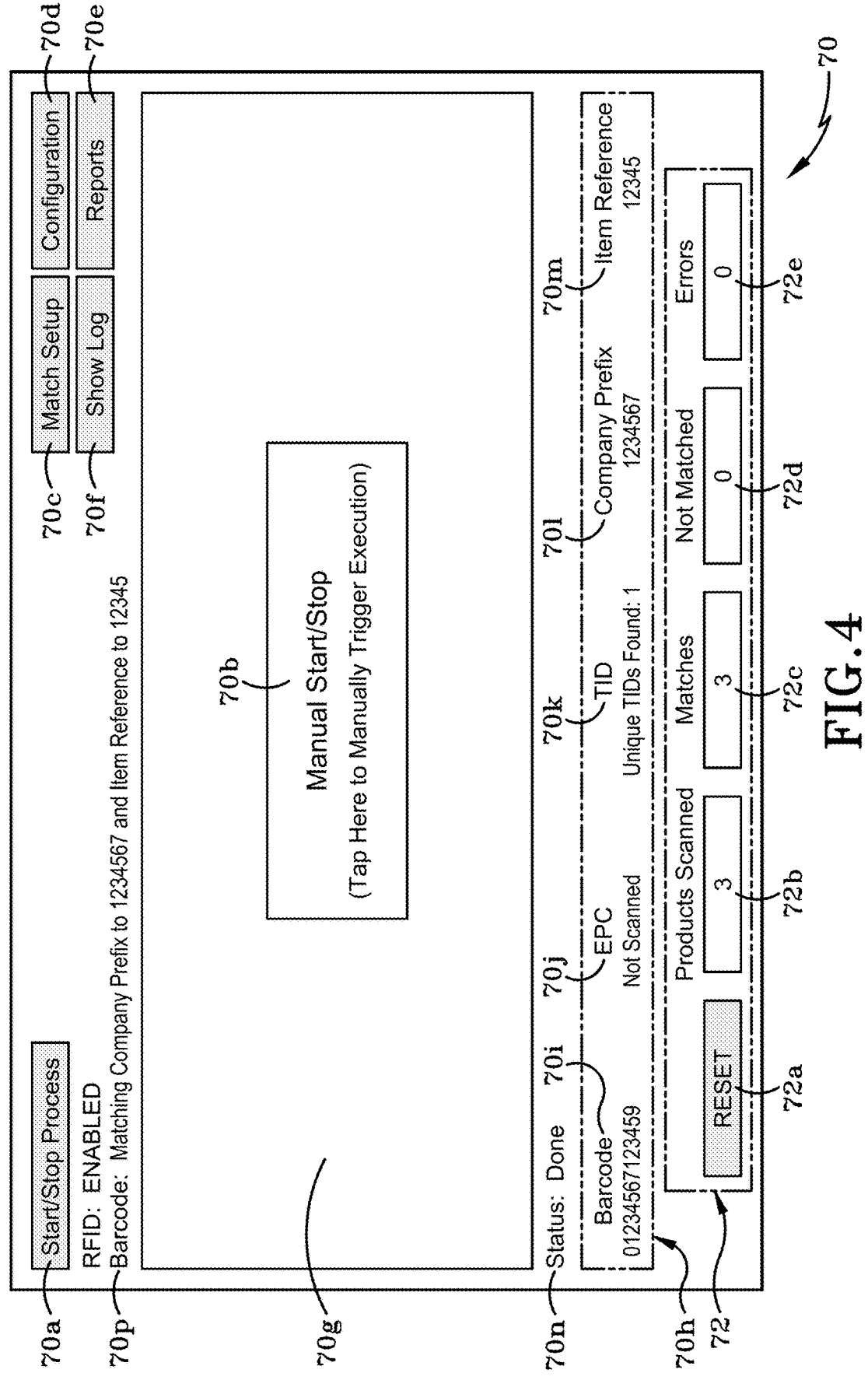
FIG. 4 is a diagrammatic view of an exemplary application screen of the verification system shown during operation of the system.

When user interface 30 is activated, the touchscreen 30*a* displays a Verification Application Screen 70 which is used to set up and start a verification operation to be performed on a plurality of articles 14 which are to be moved by conveyor 12 passed system 10. FIG. 4 shows an exemplary Verification Application Screen 70 which is displayed on touchscreen 30*a* of user interface 30. Verification Application Screen 70 may be referred to hereinafter as "screen 70". Screen 70 includes a plurality of icons or "buttons" for activating and deactivating several functions of system 10. As shown in FIG. 4, the displayed buttons on screen 70 include a Start/Stop Process button 70*a*; a Manual Start/stop button 70*b*; a Match Setup button 70*c*; a Configuration button 70*d*; a Reports button 70*e*; a Show Log button 70*f*, and a Color Indicator Status region 70*g*. The Color Indicator Status region 70*g* comprises a substantial portion of the screen 70 because this region visually displays the results of the system's evaluation of an article 14 for an operator and therefore needs to be easy to see from a distance. Screen 70 further includes a Data Values section 70*h* located below Color Indicator Status region 70*g*. Data values section 70*h* displays the current scan's data. The displayed current scan data includes a Barcode 70*i*, an Electronic Product Code (EPC) 70*j*, a Tag Identifier (TID) 70*k*, a Company ID or Prefix 70*l*, and a Product ID or Item Reference 70*m*. Screen 70 further includes a System Status indicator 70*n* and a Current Configuration 70*p*. Each of these buttons, indicators, regions, and displays 70*a* through 70*p* will be discussed in greater detail hereafter.

As indicated above, screen 70 includes Start/Stop Process button 70*a* (FIG. 4). Button 70*a* is activated via operator touch on user interface 30 as a first step to begin a new verification operation, i.e., by "pressing" of the button 70*a*. Button 70*a* is actuated after a product is "set up". A product is "set up" when an initial identity of an RFID tag is established and compared with a "model" tag. The contacting of the Start/Stop Process button 70*a* does not start the verification process but rather activates the entire system 10. Obviously, before Application Verification Screen 70 is displayed, the operator will have moved the switch on the AC Power Entry 50*a* (FIGS. 2 and 3) to the "ON" position.

It will be appreciated that the operation of "pressing a button" is a physical representation that may be interpreted variously as "input data," "input command," "check a box," "activate a function" or "start a (computer-run) process." The button 70*a* shown in FIG. 4 is an icon on user interface 30 but in other instances the button may be a physical button provided elsewhere on system 10 which has to be manually depressed, toggled, or otherwise activated by the operator. It will be understood that "pressing a button" is therefore not the only way to enter data or commands into system 10.

The Manual Start/Stop button 70*b* (FIG. 4) is touched by the operator in order to initiate the performance of an actual verification operation. Upon activation of button 70*b*, the user interface 30 is also ready to accept input from a photo eye trigger, that is, input from a photoelectric sensor provided as part of system 10, to begin the verification process. The photo eye trigger will detect the articles 14 moving on conveyor 12 and therefore activate the rest of the components of system 10 to perform the verification operation.

The Match Setup Button 70*c*, also known as the Multipack mode button 70*c*, (FIG. 4) is activated when it is desired to run the verification operation on multiple RFID-tagged items provided in a single case or package.

Configuration Button 70*d* (FIG. 4) is activated in order to access a Configuration Screen 80 (FIG. 5) in order to set up all the parameters of system 10 in order to run a verification operation. In particular, Configuration Button 70*d* is used to enter all settings and product information for the system to validate the RFID and/or barcode data. A password may be required to be entered upon activation of the Configuration Button 70*d* or to allow the operator to enter parameters on the Configuration Screen 80 as will be discussed later herein. The process preferably is password protected at an Administrative level as the parameters entered into system 10 utilizing the Configuration Button 70*d* can greatly affect the setup and performance of the verification system.

Reports button 70*e* (FIG. 4) is activated in order to select a date range for verification reporting. Show Log button 70*f* (FIG. 4) is activated in order to either display or hide a log file. The system 10 creates a log file of each RFID tag 16 and/or barcode 18 the system 10 reads. The log file includes a date/time stamp and a status of each RFID tag read and/or barcode read. The log file will display the status of the read as "pass", "fail", "missing", or "error". If the status on the log file is "pass", the read RFID tag and/or barcode includes information which matches the expected information/product data associated with a particular article 14 as stored in the memory 46c (FIG. 3) of control module 46. If the status on the log file is "fail", the read RFID tag and/or barcode includes information which does not match the expected information/product data associated with a particular article 14 as stored in memory 46c of control module 46. If the status on the log file is "missing", then system 10 failed to detect any RFID tag 16 and/or barcode 18 on the article 14. If the log file status is "error", then some issue arose during the read or log file display that has to be further investigated. The log files detail all system processes and are used for troubleshooting and support.

Color Indicator Status region 70g (FIG. 4) is automatically activated by system 10 during a verification operation in order to show the status of the current operation in real time. The Color Indicator Status region 70g visually displays different colors thereon, with each color signifying a different status condition. As will be discussed later herein, during set up of the system 10, the operator is able to select a particular color to be displayed on region 70g to indicate various statuses. The system 10 is configured to be able to selectively display the colors green, blue, yellow, and red on the Color Indicator Status region 70g. In one aspect, the operator may select to display green on region 70g to indicate that the system 10 is ready or to indicate when a verification operation has been undertaken and a read RFID tag 16, for example, is a good match. In other words, region 70g will turn green when the data encoded to the read RFID tag 16 matches the expected information/product data stored in memory 46c of control module 46. In one aspect, the operator may select to display blue on region 70g to indicate that the system 10 is currently processing a scan of an article 14. In one aspect, the operator may select to display yellow on region 70g in order to indicate that that the scanned article is "missing" an RFID tag 16 and/or barcode 18. In one aspect, the operator may select to display red on region 70g to represent an error condition or a mismatched scan, i.e., a "fail" condition. In other words, red may be displayed on the region 70g if the information encoded to the RFID tag 16 read by system 10 does not match the expected information/product data associated with a particular article 14 as stored in the memory 46c of the controller 46.

As indicated previously herein, screen 70 includes a Data Values section 70h (FIG. 4) which displays data relevant to the current scan. The displayed current scan data includes a Barcode 70i, an Electronic Product Code (EPC) 70j, a Tag Identifier (TID) 70k, a Company ID or Prefix 70l, and a Product ID or Item Reference 70m. Values will be entered by system below each of the Barcode 70i, EPC 70j, TID 70k, Company Prefix 70l, and Item Reference 70m. So, for example, below Barcode 70i, screen 70 will display the actual read barcode 18 of the article based on the data gathered by barcode imager 28. If an RFID tag 16 on article 14 was interrogated by RFID reader 44 and a company prefix was found encoded to tag 16, the company prefix data will be displayed below the words "Company Prefix" 70l on screen 70.

Referring still to FIG. 4, the System Status indicator 70n is located below the Color Indicator Status region 70g on screen 70. The System Status indicator 70n identifies the current status of the application. The status is displayed using words such as "scanning", "processing" or "done". Other statuses may also be displayed via the System Status indicator 70n. For example, the System Status indicator may display which firmware version of the RFID reader 44 is being utilized. This displayed information may be useful for personnel who are utilizing or maintaining system 10.

The Current Configuration indicator 70p on screen 70 (FIG. 4) identifies which mode the system 10 is currently running. In other words, the Current Configuration 70p will indicate whether the system 10 is performing an RFID tag read only, or a barcode read only, or is reading both RFID tags and barcodes, or is performing a multi-pack scan.

FIG. 4 shows that screen 70 also includes Real Time Counter Display 72. Display 72 includes a reset button 72a, a Products Scanned counter 72b, a Matches counter 72c, a Not Matches counter 72d, and an Errors counter 72e. The Products Scanned counter 72b displays the total number of products scanned by the system 10 during performance of the current verification operation in real time. The Matches counter 72c displays the number of RFID tags/barcodes scanned which include encoded information which matches the information stored in the memory 46c of control module 46. The Not Matches counter 72d displays the number of RFID tags/barcodes scanned which include encoded information that does not match the information stored in memory 46c. The Errors counter 72e displays the number of scans for which an error was displayed on the Color Indicator Region 70g for failing to have any RFID tag/barcode applied thereto or relating to scans of articles which failed the verification process for other reasons. The counters 70b, 70c, 70d, and 70e are reset by pressing the Reset button 72a before or after a scan of a plurality of articles 14. The counters 70b, 70c, 70d, and 70e are also automatically reset when the Start/Stop buttons 70a, 70b are actuated on screen 70.

Figure 5:
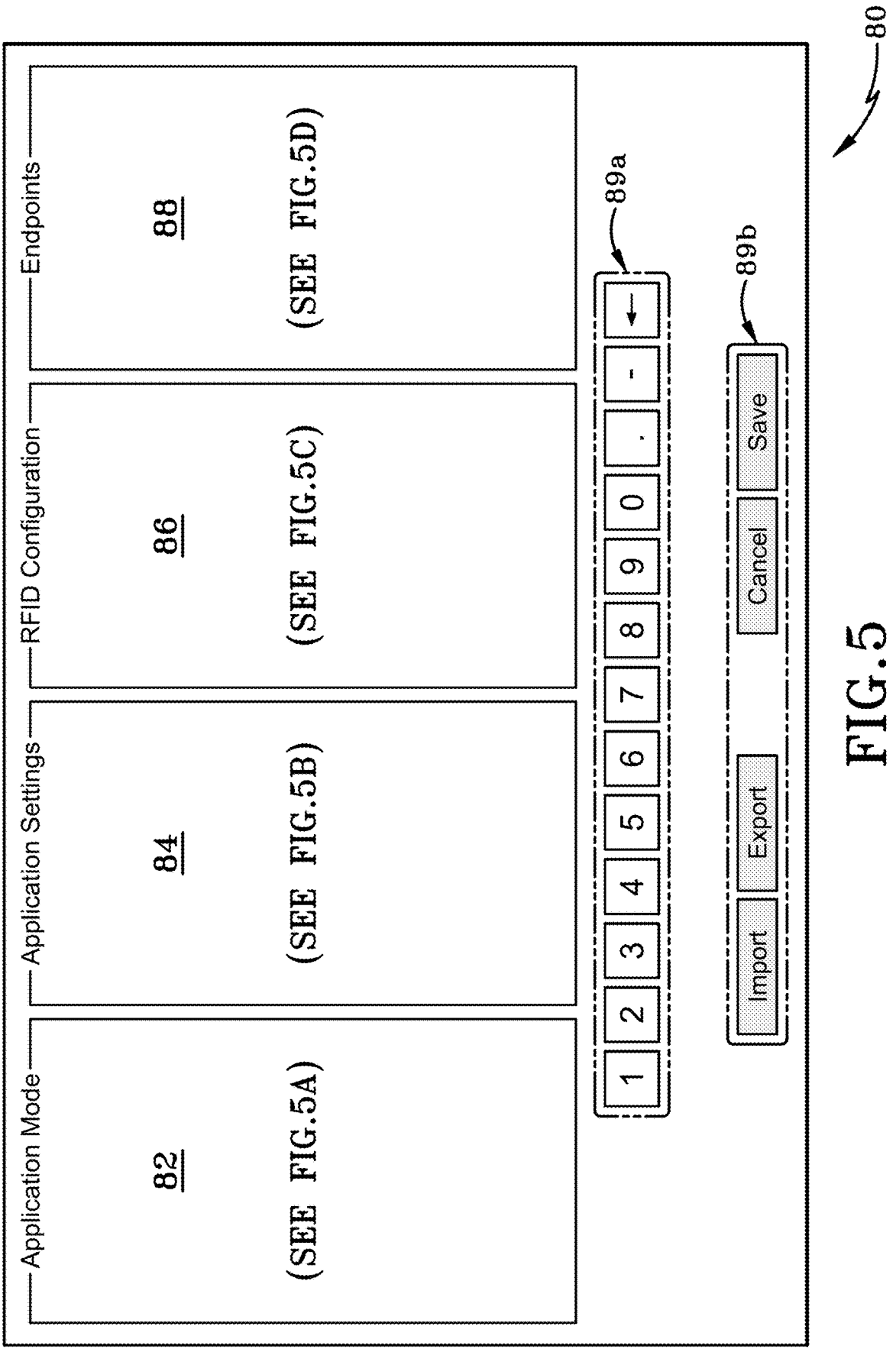
FIG. 5 is a diagrammatic overview of various submenus displayable on the application screen of the verification system.

When an operator is to run a verification operation, the first step required in the process is setting the parameters of the system 10, i.e., configuring the system 10. In order to start configuring system 10, the operator activates the Configuration button 70d on screen 70. As mentioned previously, the configuration button 70d is used to set all settings and product information for the system to validate the RFID and barcode data. When button 70d is pressed, a Configuration Screen 80 (FIG. 5) is displayed on the touchscreen of user interface 30. The Configuration Screen 80 comprises four submenus which may be utilized by the operator to set the parameters for the verification operation. The operator will go through the four submenus and select the appropriate parameters. The four submenus on the Configuration Screen 80 are an Application Mode 82 (FIG. 5 and 5A), Application Settings 84 (FIG. 5 and 5B), RFID Configuration 86 (FIG. 5 and 5C); and Endpoints 88 (FIG. 5 and 5D). A numerical keypad 89a (FIG. 5) and general function buttons 89b of import, export, cancel, and save are displayed on the Configuration Screen 80 below the four submenus. The keypad 89a and general function buttons 89b are utilized by the operator to enter information which may be required on any of the submenus.

Figure 5A:
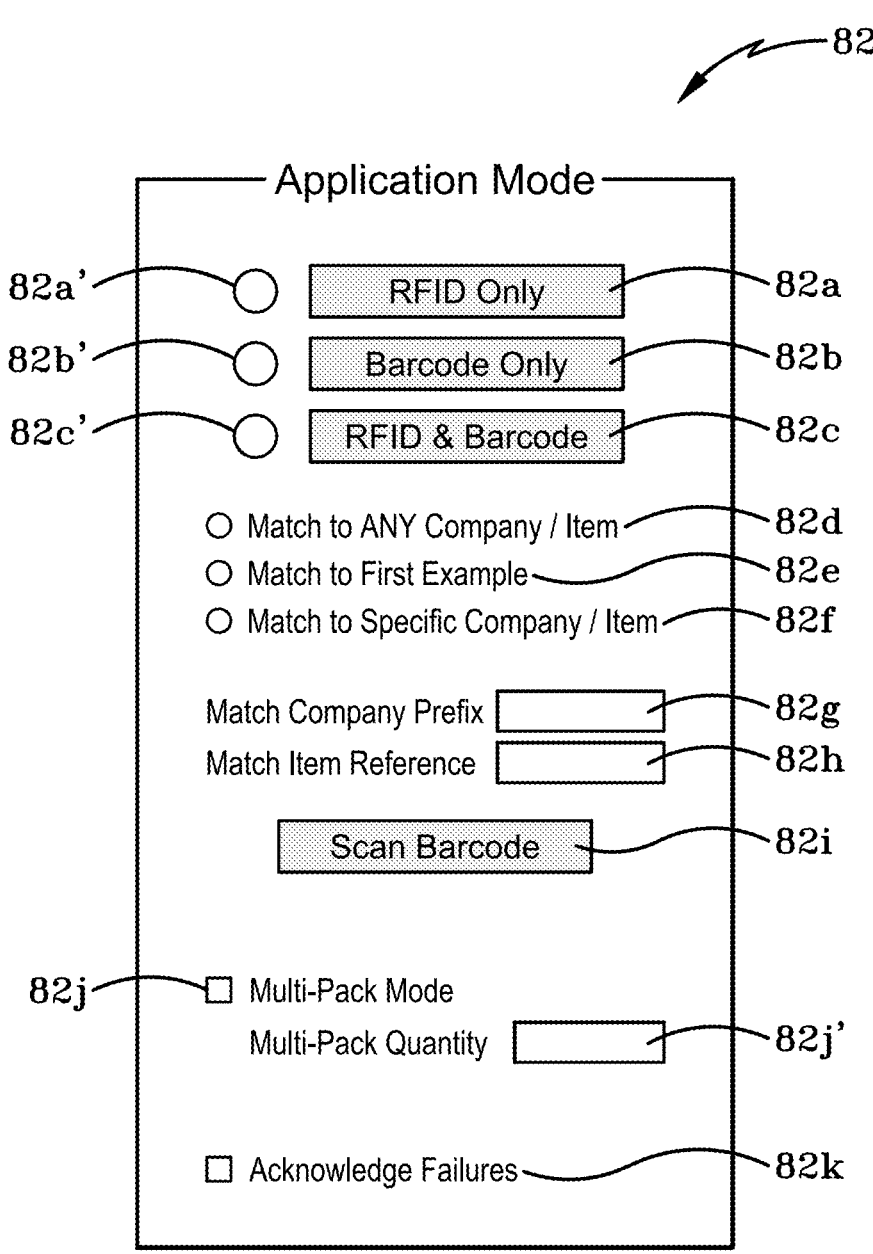
FIG. 5A is a diagrammatic view of an application mode submenu of the application screen shown in FIG. 5.

Referring to FIG. 5A, the Application Mode submenu 82 includes three buttons 82a, 82b, 82c which enable the operator to choose various operation modes as a first step of the setup. The possible operation modes include RFID-only mode 82a, Barcode-only mode 82b, and RFID & Barcode mode 82c. As suggested by the names, RFID-only mode 82a, when actuated, will set up system 10 to only scan articles 14 for RFID tags 16 (FIG. 1). Barcode-only mode 82b will set up system 10 to only scan articles 14 for barcodes 18 (FIG. 1). RFID & Barcode mode 82c will set up system 10 to scan articles 14 for both RFID tags 16 and barcodes 18. Each aforementioned mode is selected by the operator and the confirmation of that selection is indicated on the Configuration screen 80 as active by a respective radio button 82a', 82b', and 82c' changing form. For example, selecting RFID-only mode 82a may cause the radio button 82a' to change from being a blank circle to including a check mark or being shaded.

In a next step, the operator is able to select a matching type from the menu of options displayed on Application Mode submenu 82 (FIG. 5A). The options available to the operator include Match to Any Company/Product 82d; Match to First Example 82e; and Match to Specific Company/Product 82f. Selection of the option to Match to Any Company/Product 82d confirms that the RFID tags or barcode labels, respectively match each other (i.e., no product or company checks). Match to First Example 82e is selected to train the system 10 by scanning the first RFID tag 16 or first Barcode 18 presented to the system 10 and then enabling the system 10 to subsequently used that learned information to verify other RFID tags and barcodes. Match to Specific Company/Product 82f is selected to enter a specific Company and/or Product UPC. If Match to Specific Company/Product 82f is activated, then data representing a company and/or product code must be entered in the box Match Company Prefix 82g and/or Match Item Reference 82h.

The operator will select Scan Barcode 82i if applicable. If the articles 14 to be scanned and verified are packaged with one another, the operator will select Multi-Pack mode 82j and will enter the quantity of articles per pack/case into the Multi-Pack Quantity box 82j'.

A third step which the operator may undertake on the Application Mode submenu 82 (FIG. 5A) is to select the Acknowledge Failures/Error Mode 82k if applicable. The Acknowledge Failures/Error Mode 82k button is selected to require a manual confirmation of system-detected error conditions by the operator of the verification system 10.

Figure 5B:
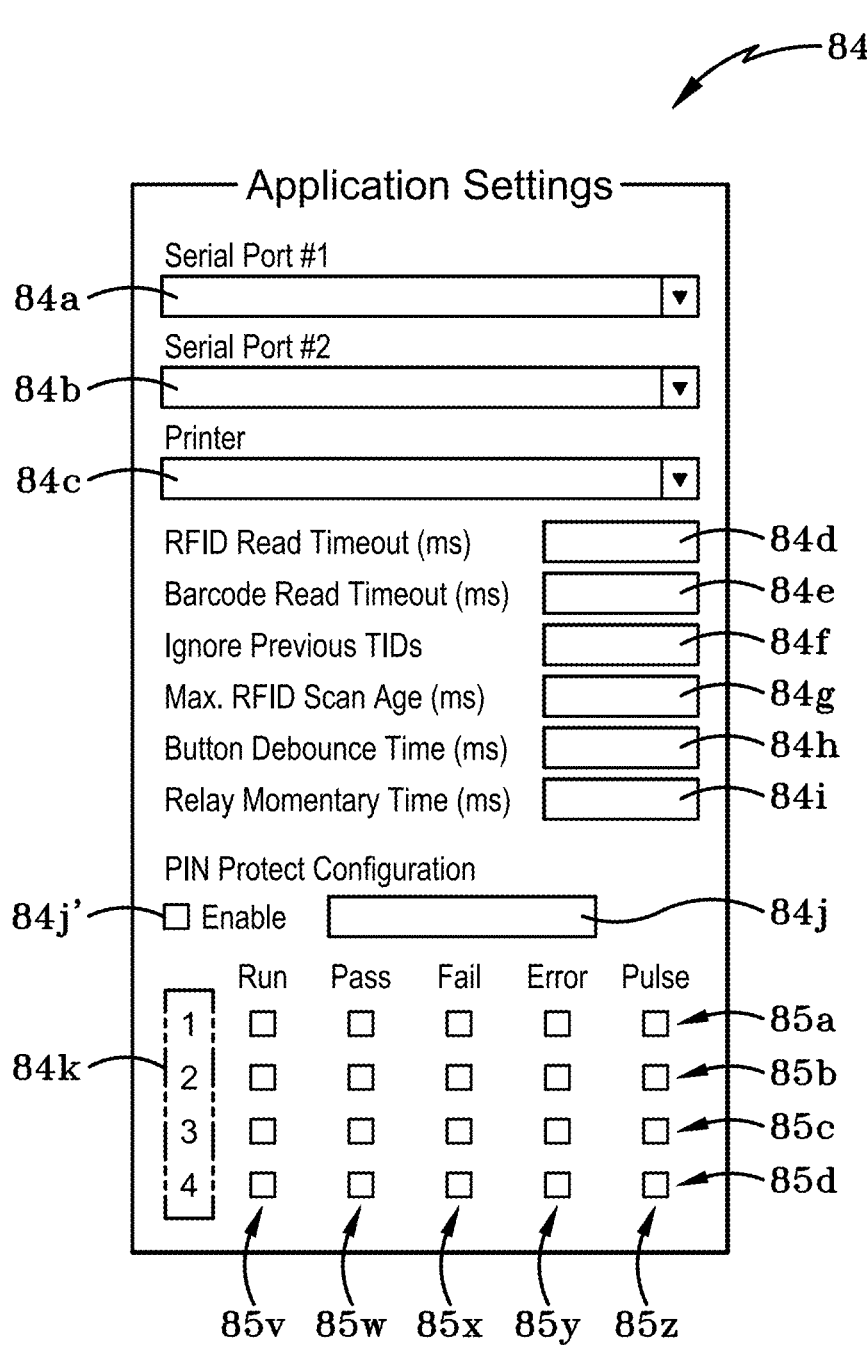
FIG. 5B is a diagrammatic view of an application settings submenu of the application screen shown in FIG. 5.

Once the operator has set the desired parameters on the Application Mode submenu 82, the operator will select certain parameters on the Application Settings submenu 84 (FIG. 5B). The Application Settings submenu 84 includes default settings for Serial Port #1, numbered 84a on the submenu, and Serial Port #2, numbered 84b. Serial Port #1 relates to barcode imager 28 (FIG. 1). If a second barcode imager is used in system 10, then Serial Port #2 relates to that second barcode imager. Both of the settings for Serial Port #1 (84a) and Serial Port #2 (84b) are preset. These default settings should not be changed.

Application Settings submenu 84 also includes a Printer setting, numbered 84c. The operator is able to select a network printer from a dropdown menu. Additionally, the Application Settings submenu 84 includes the following fields which are available for entry of desired parameters, namely, an RFID timeout 84d (in milliseconds), a Barcode Read Timeout 84e (in milliseconds), a Ignore Previous TIDs 84f, a Mac RFID Scan Age 84g (in milliseconds), a Button Debounce Time 84h (in milliseconds), and a Relay Momentary Time 84i (in milliseconds). The RFID timeout 84d establishes how long the system 10 will try to read a particular RFID tag 16 before the system discontinues the attempted read. Barcode Read Timeout 84e sets how long the system 10 will try to scan a particular barcode 18 before the system discontinues the attempt. The Ignore Previous TIDs (i.e., ignore previous Tag Identifiers) 84f is set to instruct the system 10 to ignore a given TID if that TID is read again. This setting 84f can be used when multiple RFID antennas are used or to extend the read zone. If left blank, this feature is disabled. The Ignore Previous TIDs 84f is an advanced feature that most users do not need to configure. This setting (Ignore Previous TIDs 84f) is also reset when the "Start/Stop Process" button 70a (FIG. 4) is pressed.

The Application Settings submenu 84 further includes a Max RFID Scan Age 84g (in milliseconds), which is set to address a situation where the system 10 is continually reading a particular RFID tag for an extended period of time. At some point, the system 10 must consider an RFID tag "too old" and ignore it. The term "too old" is to be understood that a given RFID tag 16 is sitting in the read zone of the RFID antenna 26 for an unreasonably long amount of time relative to the desired throughput of the verification system 10. This situation applies, for example, when conveyor 12 stops moving articles 14 therealong or during breaks in use of the system 10. If a particular RFID tag is left in front of the RFID antenna 26 while the system 10 is running, the entered value in the Max RFID Scan Age field 84g tells the system 10 that this particular RFID tag is "too old" and that the system should not continue to read that RFID tag. In one embodiment, a default value of 3000 milliseconds for the Mac RFID Scan Age has been found to be useful. Other values are possible.

The Application Settings submenu 84 further includes a Button Debounce Time 84h (in milliseconds) which may be input by the operator. When using a triggered method, for example a photo-eye sensor, after a trigger occurs, the device will "electrically bounce." When a trigger occurs, there may be signal noise which can then trigger two or three times from a single triggering event. Setting this Button Debounce time 84h value helps to eliminate multiple false triggers and will limit the trigger from occurring within a specified timeframe, measured in milliseconds. This value may be as small as possible in order to achieve maximum system speed. The system may not run any faster than this preset value or RFID tag reads will be missed. This is an advanced feature that may be different for each installation and each different product packaging size. In one embodiment, this value must be lower than the RFID read timeout discussed earlier herein.

The Application Settings submenu 84 further includes a Relay Momentary Time in milliseconds which is entered into field 84i. Each output (I/O) can be set to pulse and the value entered in field 84i is the length of time that this pulse occurs. (A pulse is an electrical signal that controls an indicator or other device.) For example, the Relay Momentary Time 84i may set an indicator on the screen of user interface 30 or stop the conveyor 12 to await an action or verification from an operator.

The Application Settings submenu 84 further includes a Pin Protect Configuration box 84j which may be checked to enable the function and a value input into field 84j' to set a numeric passcode to access the Configuration Screen 80. The numeric passcode must be entered using the numeric buttons 89a (FIG. 5) on the bottom of the Configuration screen 80 in order to access and change parameters which are entered on the various submenus 82, 84, 86, and 88.

FIG. 5B also shows that the Application Settings submenu 84 includes a region which allows the operator to select a choice of color codes for display on the Color Indicator Status region 70g of the Verification Application Screen 70 (FIG. 4). The region includes a color region 84k listing the numbers "1", "2", "3", and "4" and a grid of radio buttons. The number "1" in the color region 84k represents the color blue; the number "2" represents the color green; the number "3" represents the color red; and the number "4" represents the color yellow. The radio buttons are arranged in rows 85a-85d and columns 85v-85z. The rows of radio buttons 85a-85d are aligned respectively with the numbers, "1", "2", "3", and "4". The column of radio buttons 85v are aligned with a word "RUN"; the column of radio buttons 85w are aligned with a word "PASS"; the column of radio buttons 85x are aligned with a word "FAIL"; the column of radio buttons 85y are aligned with a word "ERROR", and the column of radio buttons 85z are aligned with a word "PULSE".

Using this lower part of the Applicant Settings submenu 84, the operator can select which of the four colors he or she wants to be displayed on the Color Indicator Status region 70g of the screen 70 when certain conditions are determined by system 10 when articles 14 are scanned and read. For example, the operator can select that when an RFID tag is interrogated and the encoded data matches data stored in the memory, that the color which will be display is blue. The operator will then select the button in row 85a, column 85w. If, instead, the operator would like the color to be displayed is green in this situation, the operator will select the button in row 85b, column 85w. If the operator would like yellow to be displayed on screen 70 when errors are detected by system 10, the operator will select the radio button in row 85d, column 85y. The operator may select one, more or all the radio buttons in column 85z to trigger a momentary relay to control a conveyor stop, send light indicators etc.

Figure 5C:
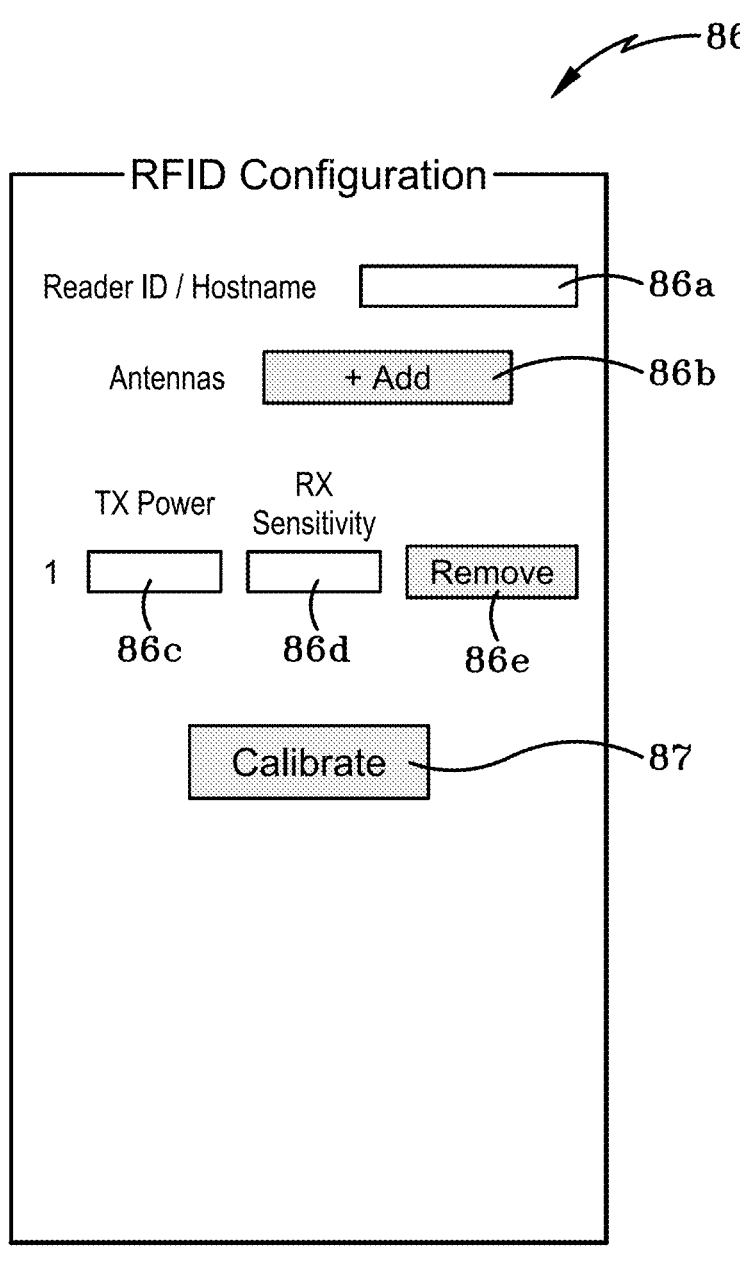
FIG. 5C is a diagrammatic view of an RFID configuration submenu of the application screen shown in FIG. 5.
Figure 5D:
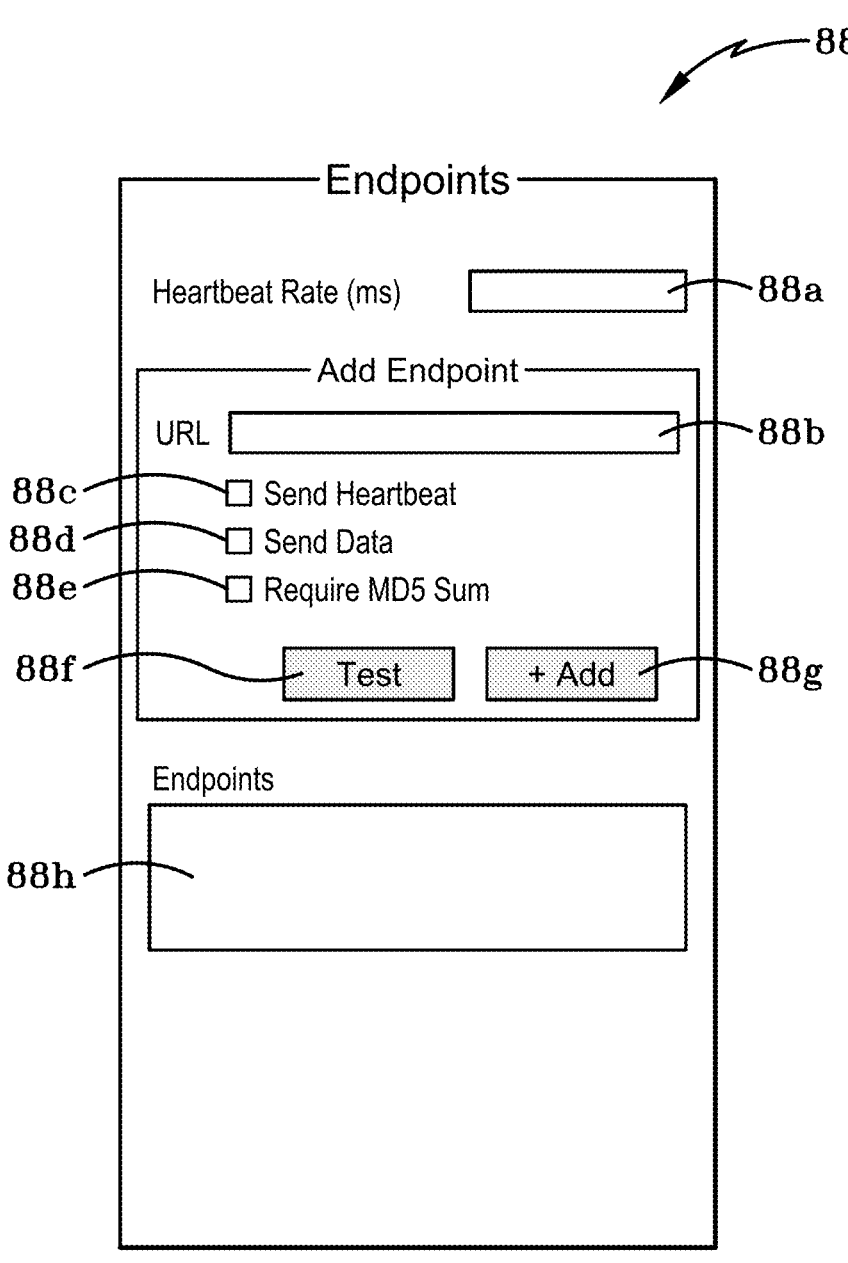
FIG. 5D is a diagrammatic view of an endpoints submenu of the application screen shown in FIG. 5.

FIG. 5C shows the third submenu of Configuration screen 80, namely, the RFID Configuration submenu 86. The RFID Configuration submenu 86 allows various inputs by the operator including a Reader IP/Host Name 86a, an add Antenna button 86b, a Transmission (TX) Power field 86c, a Receiving (RX) Sensitivity field, and a Remove button 86e. Reader IP/Host Name 86a lists the IP address of the RFID Reader 44. Typically, this field is pre-configured and should not be changed. The Add Antenna button 86b is utilized to add additional RFID antennas beyond the one RFID antenna 26 preconfigured in system 10. The TX Power field 86c displays the value of the power output to the RFID antenna 26 (in dBm). It should be noted that dBm is a unit of measurement used to indicate that a power level is expressed in decibels with reference to one milliwatt. The TX Power field 86c is an advanced feature and will greatly affect the performance of system 10. As will be described later herein, using a "Calibrate" function provided as an aspect of the present disclosure will automatically calibrate system 10 and calculate what the optimum value should be for the transmission power, and will display that value in the TX Power field 86c. During calibration, the power output from the RFID antenna is automatically calculated and the optimal value is set and displayed (in dBm) in RX Sensitivity field 86d. This value is set to reduce false reads caused by metal and other environmental elements. This is, again an advanced feature and will greatly affect the performance of system 10.

RFID Configuration submenu 86 also includes a "Calibrate" button 87. Calibrate button 87 is pressed to automatically calculate the TX and RX values that are optimal for a specific RFID tag 16 and an RFID antenna 26 based on the other parameters set for a specific environment and specific verification operation. The manner of calibrating system 10 will be described later herein in greater detail.

As indicated earlier herein, and as shown in FIG. 5D, Configuration Screen 80 further includes the Endpoints submenu 88. Endpoints submenu 88 is utilized to add various endpoints, i.e., URLs or servers, to which system 10 can send data. Endpoints submenu 88 includes a Heartbeat Rate 88a (in milliseconds) in which the operator is able to input a value in this field to send a health check heartbeat to a specific endpoint (i.e., a specific URL or server). Setting the Health Check Heartbeat provides a notification when the RFID reader 44 is not online. Endpoints submenu 88 also includes an Add Endpoints region including a field 88b adding a URL for a remote server. The Add Endpoints region also includes a Send Heartbeat field 88c, a Send Data field 88d, a Require MD5 Sum field 88e, a Test button 88f and an Add button 88g. A desired remote URL or server is entered into field 88b and the test button 88f is utilized to ensure that this endpoint is valid and can receive data from system 10. If the URL is found to be valid, then the Add button 88g is depressed to add that particular URL into a list of Endpoints displayed in box 88h. An unlimited number of endpoints can be added by inputting a URL into the field 88b, actuating the Test 88f to check the endpoint is valid and actuating the Add 88g feature to include that URL into the Endpoints list 88h.

The Send Heartbeat button 88c is selected by the operator in order to send a signal from the RFID reader 44 to a specified remote URL or server entered into the Send Heartbeat field 88c. If data is to be sent from system 10 to the specified remote URL or server, the operator selects the Send Data field 88d. If a checksum such as a MD5 sum is required, the operator selects the Require MD5 Sum field 88e. (A checksum is required to produce a verification that demonstrates that data was sent to the remote URL or server and was received correctly thereby.

Once the operator has finished entering the parameters for performing a particular verification operation into the Configuration screen 80, system 10 needs to be calibrated. Calibration is performed by utilizing the RFID Configuration submenu 86 shown in FIG. 5C. To calibrate system 10 the operator places a selected RFID tag 16 in the field of view of the RFID antenna 26 and then presses the Calibrate button 87 on the RFID Configuration submenu 86. The system 10 is thereby actuated to automatically run through the following process and will ultimately calculate optimal values for TX power 86c and RX sensitivity 86d on the RFID Configuration submenu 86. The "Remove" button 86e on the RFID Configuration submenu 86 can be pressed to reset the TX power 86c and RX sensitivity 86d values if need be.

Figure 6:
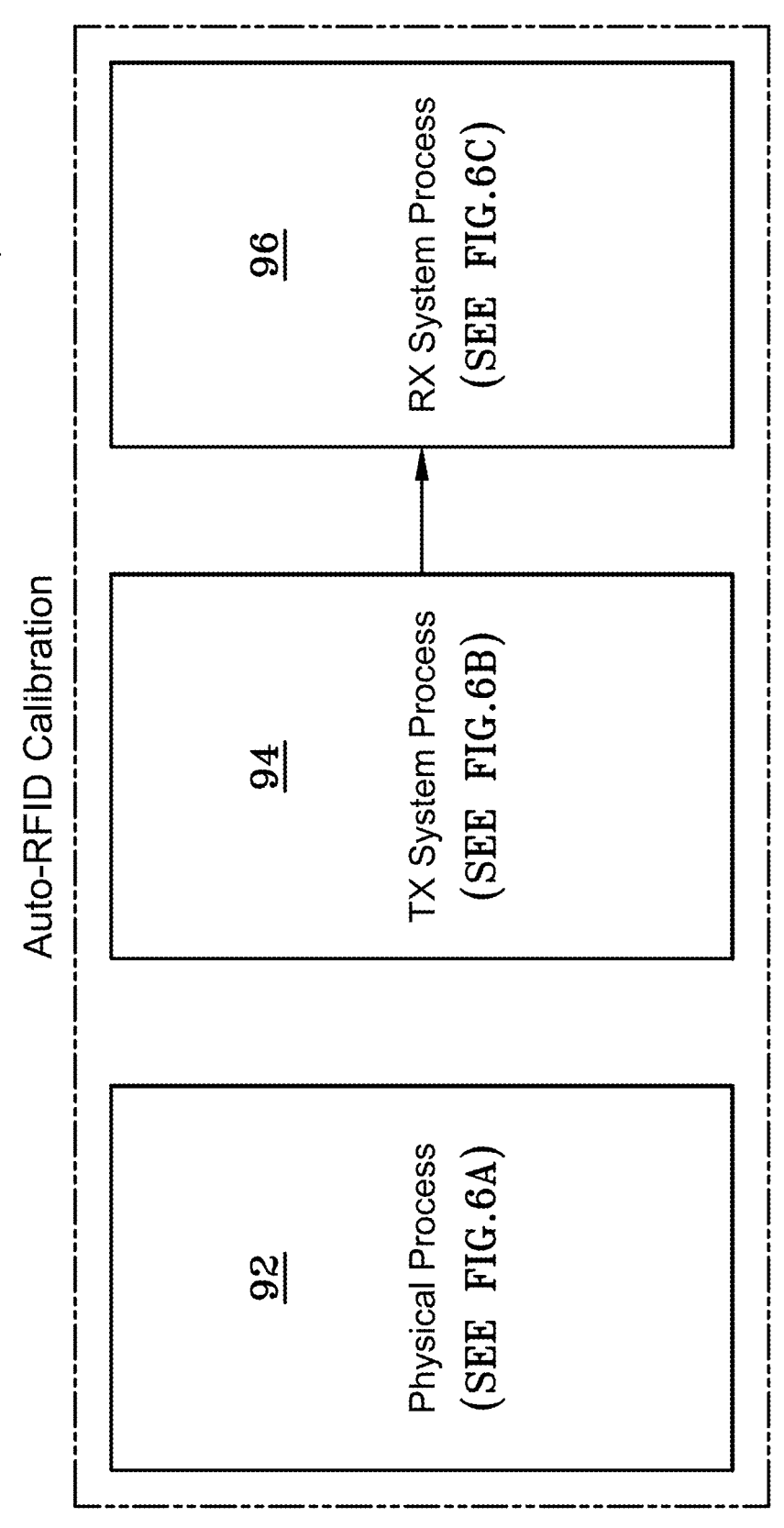
FIG. 6 is a diagrammatic overview of an Auto-RFID calibration of the verification system in accordance with an aspect of the present disclosure.
Figure 6A:
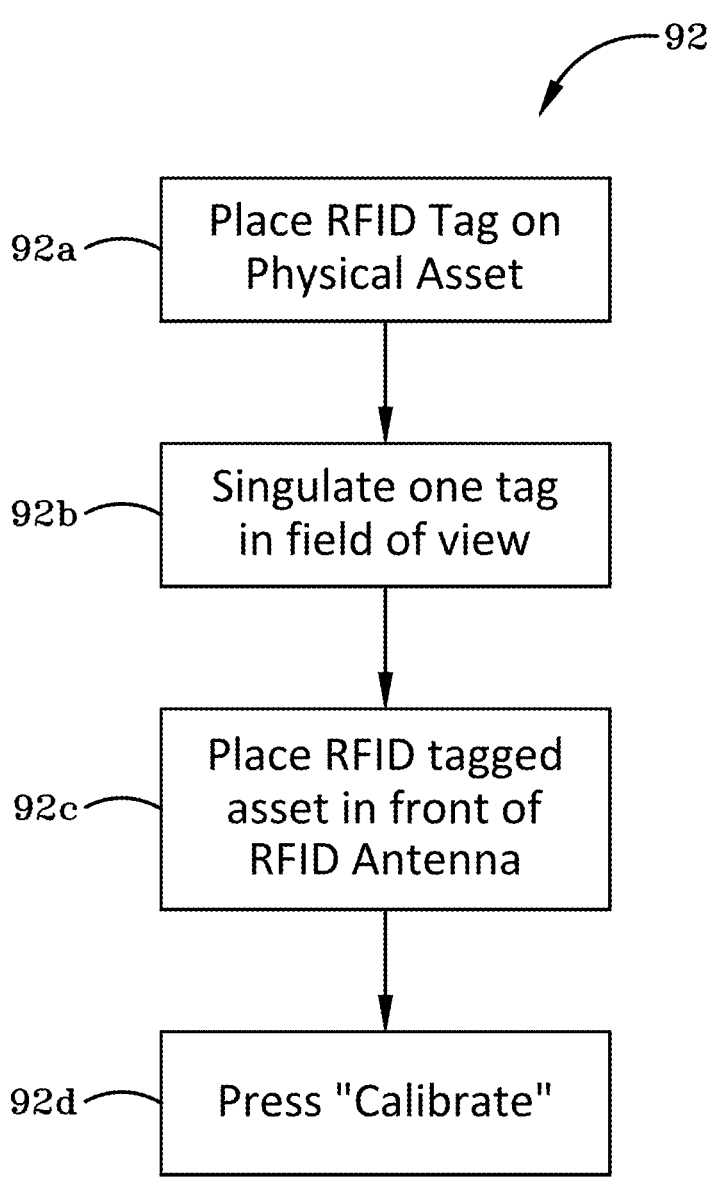
FIG. 6A is a flow chart of a first stage of the Auto-RFID calibration process shown in FIG. 6.
Figure 6B:
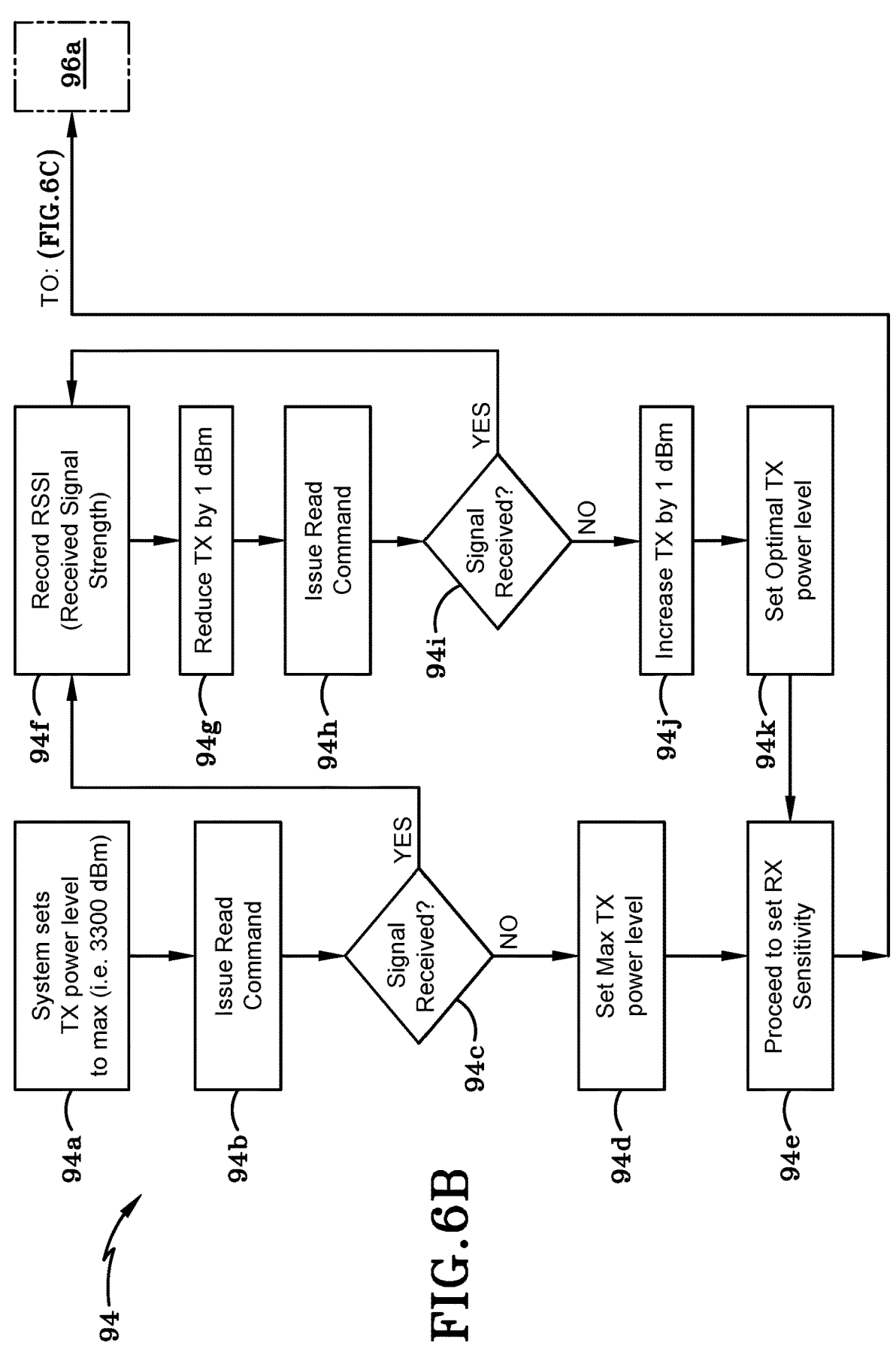
FIG. 6B is a flow chart of a second stage of the Auto-RFID calibration process shown in FIG. 6.
Figure 6C:
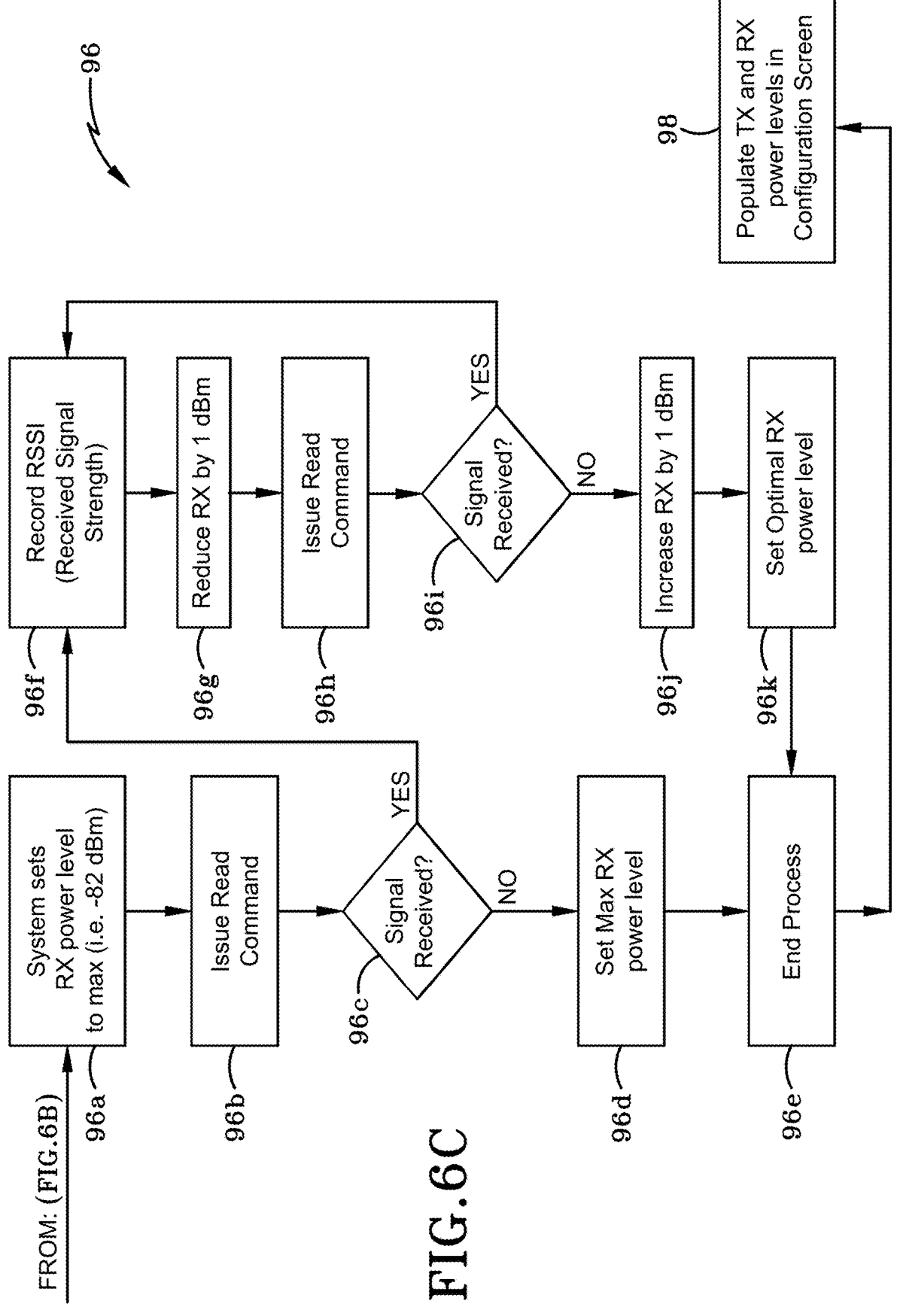
FIG. 6C is a flow chart of a third stage of the Auto-RFID calibration process shown in FIG. 6.

Referring now to FIGS. 6 to 6C, the Automatic RFID Calibration process 90 will now be described. The Automatic RFID Calibration process 90, (hereafter "calibration"), comprises three components, namely a physical process 92 (actions taken by the operator); a transmission system (TX system) process 94; and a receiving system (RX system) process 96. The physical process 92 is set forth in FIG. 6A. The TX system process 94 is set forth in FIG. 6B. The RX process 96 is set forth in FIG. 6C.

As shown in FIG. 6A, In the physical process 92 an RFID tag 16 is placed on a physical article 14 in a step 92a. Second step 92b involves singulating one tag in the field of view of the RFID reader 44. In step 92c, the RFID-tagged article 14 is placed in the field of view of the RFID antenna 26. In a further step, the operator presses the Calibrate button 87 (FIG. 5C).

Pressing the Calibrate button 87 initiates the TX system process 94 shown in FIG. 6B. In a first step, the system 10 sets the transmission power level (TX power level) to a maximum. In one embodiment, the TX power level may be set, for example, at 3300 dBm. System 10 then issues a read command 94b for the RFID reader 44 to read the RFID tag 16 on the RFID-tagged article 14. The read command is also known as "interrogation". The RFID reader 44 interrogates the RFID tag 16 and determines whether a return signal is received from the RFID tag 16 at step 94*c* in the process. If a return signal is not received, then as at step 94*d*, the transmission power level which was set in step 94*a* is now set as the Maximum TX power level, the TX system process 94 ends and the system moves, at step 94*e*, to proceed to set the RX sensitivity. In other words, the RX system process 94 ends and the system begins the RX system process 96 shown in FIG. 6C.

If a return signal is received from the RFID tag 16 by the RFID reader 44 in step 94*c*, then the received signal strength (RSSI) is recorded at step 94*f*, and the transmission power is reduced by 1 dBm in step 94*g*. System 10 then Issues a Read Command 94*h* and then determines if a return signal is received at step 94*i*. These steps of 94*f*, 94*g*, 94*h*, and 94*i* are repeated until no return signal is received at step 94*i*. When no return signal is received in step 94*i*, the transmission power level is increased by 1 dBm at step 94*j* and then the increased transmission power level is set as the Optimal TX power level in step 94*k*. Once the Optimal TX power level is set in step 94*k*, the system moves, at step 94*e*, to begin the RX system process 96 shown in FIG. 6C.

As shown in FIG. 6C, in a first step 96*a* of the of the RX process 96 the receiving power level is set to maximum, which in one embodiment is −82 dBm. The system issues a read command at step 96*b* and the RFID reader 44 reads the RFID tag 16 on the RFID-tagged article 14. The RFID reader 44 determines whether a return signal is received at step 96*c*. If a signal is not received in step 96*c*, then the maximum power level set in step 96*a* is set as the Max RX level at step 96*d*. The RX system process 96 ends at step 96*e* and, in step 98, the Max TX power level or Optimal TX power level determined in the TX system process 94 is populated into the TX Power field 86*c* on the RFID Configuration screen 86 (FIG. 5C). Furthermore, in step 98, the Max RX or Optimal RX determined in the RX system process 96 is populated into the RX Sensitivity field 86*d* on the RFID Configuration screen 86 (FIG. 5C).

If, however, a signal is received in step 96*c* of the RX process 96, then the received signal strength RSSI is recorded at step 96*f* and the RX power level is reduced by 1 dBm at step 96*g*. A read command is issued once again at step 96*h* and at step 96*i*, system 10 determines if an RSSI is received. If a return signal is received in step 96*i* then steps 96*f*, 96*g*, 96*h*, and 96*i* are repeated until no return signal is received in step 96*i*. When no signal is received in step 96*i*, the RX power level is increased by 1 dBm at step 96*j*. The RX power level of step 96*j* is then set as the Optimal RX power level and the RX process 96 ends at step 96*e*. In step 98, the Max TX power level or Optimal TX power level determined in the TX system process 94 is populated into the TX Power field 86*c* on the RFID Configuration screen 86 (FIG. 5C). Furthermore, in step 98, the Max RX power level or Optimal RX power level determined in the RX system process 96 is populated into the RX Sensitivity field 86*d* on the RFID Configuration screen 86 (FIG. 5C). The values populated into the Configuration screen 86 are then used to run a verification process with system 10.

After the RX system process 96 is ended and the TX and RX values are populated into the RFID Configuration screen 86, the calibration process if completed and system 10 is then setup, calibrated and ready to be used to perform a verification operation.

Having now described the various components of verification system 10 and 110, the use of said system will now be described. When a manufacturing facility of shipping facility receives verification system 10, the electronics control box 24, RFID antenna 26, barcode imager 28, and user interface 30 are engaged with the frame of a conveyor 12 as shown in FIG. 1.

If the mobile embodiment of the verification system 110 is received in the manufacturing or shipping facility, the electronics control box 124, RFID antenna 126, barcode imager 128, and user interface 130 are engaged with the frame 120 and the frame is moved to a position proximate a conveyor 112. Power is provided to system 10 (or 110) so that all the various components are powered and operational. It will be understood that other components, such as photo eyes will be engaged with conveyor 12 or frame 120 as needed. The following description will discuss the operation of system 10 but applies equally to system 110.

Once the system 10 is powered, the operator will activate user interface 30 and will enter the various operational parameters for an upcoming scan into the system 10. For example, the operator will determine if only RFID tags are to be scanned or only barcodes are to be scanned, or if RFID tags and barcodes are to be scanned. The operator will make appropriate entries in this regard on the Application Mode submenu 82 (FIG. 5A). The operator will also make appropriate entries regarding whether the RFID tags (and/or barcodes) are to be matched to any company or item or to a first example of an RFID tag or barcode; or are to be matched to a specific company or item. The operator will also make appropriate entries on the Application Mode submenu 82 regarding whether or not multi-pack mode is required and if failures are to be acknowledged. Utilizing the Applications Settings submenu 84, the operator will enter any desired parameters for the upcoming scan regarding which network printer to use, will set RFID Read Timeout 84*d*, Barcode Read Timeout 84*e* etc.

When all appropriate parameters have been entered, the operator will initiate automatic calibration of the system as discussed previously herein with respect to FIGS. 6 through 6C. When calibration is completed the operator is able to initiate a scan of a plurality of RFID-tagged and/or barcode labeled articles 14 moving along conveyor 12.

FIG. 1 shows a first article 14*a* and a second article 14*b* being moved by conveyor 12 in a direction indicated by arrow "A." Each of the articles 14*a*, 14*b* has been RFID-tagged. Specifically, the first article 14*a* is provided with a first RFID tag 16*a* and the second article 14*b* is provided with a second RFID tag 16*b*. As illustrated by way of the phantom lines in FIG. 1, RFID tags 16*a*, 16*b* are embedded within an interior of the product 14 or within an interior of the product packaging. In other embodiments, the RFID tags may be applied to an external surface of the product packaging. RFID tags 16*a*, 16*b* provided on articles 14*a*, 14*b* may be active or passive RFID tags. The RFID tags 16*a*, 16*b* are encoded with information, the nature of which is to be determined and analyzed by verification system 10. FIG. 1 also shows that articles 14*a*, 14*b* are provided with any one of a number of different types of barcode, generally referred to by reference character 18. In particular, article 14*a* is provided with a barcode 18*a* and article 14*b* is provided with a barcode 18*b*.

As articles 14*a*, 14*b* are moved by conveyor 12 in the direction "A", each article successively enters the field of view of barcode imager 28 and then the field of view of RFID antenna 26. (It will be understood that system 10 may be differently arranged and the articles 14*a*, 14*b* will first end the field of view of RFID antenna 26 and then the field of view of barcode imager 28.) System 10 will scan for RFID tags 16 only, or scan for barcodes 18 only, or scan for both RFID tags 16 and barcodes 18, or perform a multi-mode scan for RFID tags that are applied to multiple articles in a single package, depending on the parameters entered earlier into system 10.

In a first exemplary task performed by verification system 10, the articles 14a, 14b are scanned by one or both of RFID antenna 26 and barcode imager 28 (depending on the initial settings of system 10) to determine if there are any RFID tags 16 and/or barcodes 18 applied to articles 14a, 14b. Barcode imager 28, when actuated, will scan articles 14a, 14b for any barcodes 18 present thereon. The scanning of articles 14a, 14b by barcode imager 28 illustrated in FIG. 1 is represented by reference character "B". RFID antenna 26, when actuated, will emit radio waves and will receive signals back from any RFID tags 16 affixed to articles 14a, 14b. The emitted radio waves and received signals are indicated in FIG. 1 by the reference character "B".

If an article 14a, 14b is scanned by system and no expected RFID tag and/or barcode 18 or tag 16 is located, i.e., the expected tag 16 or barcode 18 is missing, the system 10 is set up to display an error status on the touchscreen 30a of user interface 30. In particular, the touchscreen 30a will display the Verification Application Screen 70 (FIG. 4) thereon and the Color Indicator Status region 70g of screen 70 will display the color selected by the operator on the Applications Setting submenu 84 (FIG. 5B). So, for example, if the operator selected that an "Error" should display as a yellow color, the Color Indicator Status region 70g will be yellow. If the operator selected that an "Error" should display as a blue color, then the Color Indicator Status region 70g will be blue.

Additionally, if the operator set a parameter to stop the conveyor 12 in the occurrence of an "Error", system 10 will automatically stop the conveyor 12. The operator can then remove the article which lacks an expected RFID tag 16 and/or an expected barcode 18 from conveyor. Alternatively, the operator may correct the situation and apply an RFID tag and/or barcode 18 to the article. The article can then be placed in a position on conveyor 12 where it will be rescanned by system 10. The fact that an "Error" has occurred will also be displayed in the Errors field 72e on screen 70 (FIG. 4) and will be recorded in the log file for the verification operation.

If articles 14a, 14b are scanned and the expected tag 16 and/or barcode 18 are found, then RFID antenna 26 and/or barcode imager 28 will gather data from the located tag 16 and/or barcode 18. RFID tags 16a, 16b use radio waves to communicate their identity and other encoded data to RFID antenna 26 and thereby to RFID reader 44 housed within electronics control box 24. RFID reader 44 reads the encoded data and relays the same to control module 46. Control module 46 includes programming which enables system 10, in a second exemplary task, to verify if the particular RFID tag 16a, 16b and/or barcode 18a, 18b applied to the respective articles 14a, 14b includes the correct data for that particular article 14a, 14b. The data relayed by RFID reader 44 to control module 46 is compared to data stored in memory 46c. If an incorrect RFID tag is applied to an article 14, the information encoded to that RFID tag will not match relevant information about that article 14 stored in the memory 46c of the control module 46. Instead, that incorrect RFID tag will be encoded with data about another article or another manufactured. If a correct RFID tag 16 is applied to an article 14, the information encoded to that RFID tag will match relevant information about the article stored in the memory 46c of the control module 46. Depending on the results of the comparison of the read data with the stored data, the Color Indicator Status region 70g of screen 70 (FIG. 4) will display the color set by the operator on the Application Settings submenu 84 (FIG. 5B). For example, the operator may have set the system to display green on the region 70g if the read RFID tag 16 and/or barcode 18 was encoded with matching data to that stored in the memory 46c. Matching the read data with the stored data is considered to be a PASS condition and the conveyor 12 will continue to operate and move the next article 14 into the field of view of the barcode imager 28 and RFID antenna 26.

The operator may furthermore have set the system 10 to display red on the region 70g if the read RFID tag 16 and/or barcode 18 was encoded with other data that does not match the data stored in the memory 46c. This situation is considered to be a FAIL condition by the system 10 and the conveyor 12 may be automatically stopped so that the incorrectly tagged and/or labeled article 14 may be removed therefrom. In some instances, the incorrectly tagged and/or labeled article by be removed by the operator but in other instances the conveyor could include an air-plunger or other similar equipment that will automatically knock out the particular article. Alternatively, the affected article could be marked or identified in some manner to indicate that it is incorrectly tagged and/or barcode labeled and so that corrective action could be undertaken after the verification operation is completed.

In addition to having an article 14 that is identified by system 10 as being incorrectly RFID tagged or barcode labeled, there are other instances where the tag 16 and/or barcode 18 is missing or where the wrong product has been scanned. System 10 may be configured to stop the conveyor 12 or knock out untagged or unlabeled articles 14 or incorrect types of articles that should not have been included in the verification operation. For example if a plurality of products of a first shape or size is moving along the conveyor and a product of a second shape or size is included in the products moving along the conveyor 12, the system 10 may be configured to recognize, via coupling to various optical sensors, the incorrectly shaped and sized second product and stop the conveyor 12 when that second product is scanned.

If an article includes a correct RFID tag 16 but an incorrect barcode 18 or vice versa, the system will consider this to be an ERROR condition and display a selected color for an error on the screen 70g. The system may be set up to stop the conveyor when an ERROR condition is determined so that the affected article can be removed therefrom.

Each read of an article moving along the conveyor 12 is logged in a log file stored in the memory 46c. The log file can be viewed by the operator by pressing the Show Log button 70f on the screen 70 (FIG. 4). Utilizing the Verification Application Screen 70 (FIG. 4), the operator is furthermore able to track the number of products or articles scanned, the number of matches between tagged and/or labeled articles relative to the database per readout, the number of mismatched (or "not matched") tagged and/or labeled articles relative to the database per readout, and the number of errors (i.e., non-tagged articles or non-read articles) utilizing the counter displays 72b, 72c, 72d, and 72e, respectively on screen 70.

Once all of the articles 14 to be scanned in a verification operation have been scanned, the operator is able to generate a variety of different reports using the Reports button 70e on the Verification Application Screen 70. One exemplary report which may be generated is a Verification Report that can be utilized by a manufacturer as part of their quality control process. Such a Verification Report may be transmitted electronically to the end customer and/or may accompany a shipment of the scanned articles. Such a report will aid the manufacturer to better improve their tagging and/or labeling of articles 14 with RFID tags and/or barcodes 18. In particular, such a report will help the manufacturer better ensure that all products leaving their facility include the appropriate tags 16 and/or barcodes 18, and that the information encoded to the tags 16 and/or barcodes 18 is accurate relative to the product or article 14 to which the tags 16 and/or barcodes 18 are applied. Verification Reports may also be given to or produced by shipping companies to help them ensure they have received the correct type and quantity of tagged and labeled products, and to better help them track products through their shipping process. Verification Reports are also able to be provided to a customer so that they can ensure that all products which left the manufacturing facility and have passed through the hands of the shipping company have been received. The Verification Report can also act as proof to the customer that all products 14 supplied to them were tagged with RFID tags 16 and/or barcodes 18 when they left the manufacturing and/or shipping facility and that all supplied products include RFID tags 16 and/or barcodes 18 with accurate product and manufacturer information encoded thereon.

While the verification system 10 has been described herein as being used to verify RFID tags 16 and/or barcodes 18 applied to articles, such as manufactured products, 14, it should be understood that the Verification System 10 may be utilized in other spheres. For example, if labels for products are produced with an RFID printer, the verification system 10 may be operatively engaged with the RFID printer. The verification system 10 can be used to ensure that RFID tags and/or barcodes are, in fact, applied to any type of physical label being printed by the RFID printer, such as a product label to be applied to a product. Other types of label could include running or racing bibs with RFID tags applied thereto. Furthermore, the verification system 10 can be used to ensure that data encoded to any RFID tag and/or barcode applied to the physical label is encoded with correct data that matches stored data relating to the product, manufacturer, or end consumer.

Verification system 10 thus provides an apparatus and process for manufacturers and suppliers to ensure that all products leaving their facility are RFID-tagged and/or barcoded and that each product has a unique, operational, and verified RFID tag 16 and/or barcode 18. Furthermore, the verification system 10 helps manufacturers and suppliers ensure that there are no duplicate RFID tags 16 or barcodes 18 on products manufactured and/or shipped from their facility. Still further, verification system 10 helps manufacturers and suppliers ensure that each RFID tag 16 and/or barcode 18 sent out from their facility is correctly encoded for the product to which that tag or barcode is applied.

In one embodiment, a product verification system 10 is disclosed herein comprising a reader 44 and/or 28 and a trigger mechanism 26 (for the reader 44). It will be understood that for the barcode imager 28, the trigger mechanism may be integral with the imager 28 while in other instances the trigger mechanism may be a sensor 25 such as a photo eye or a camera that initiates the function of the barcode imager. In system 10, the trigger mechanism is coupled with the reader 44 and/or 28. System 10 further comprises a controller 46 coupled with the trigger mechanism and the reader 44; a memory 46c coupled with the controller 46, said memory 46c having stored therein a database of information concerning articles of manufacture 14. Programming provided in the controller 46 is configured to control the trigger mechanism 26 and/or 25 and the reader 44 and/or 28; wherein the reader 44 and/or 28 is operable to interrogate an article 14a, 14b that comes into a field of view of the trigger mechanism 26 and/or 25; and wherein the programming is configured to determine if an RFID tag 16 and/or a barcode 18 is applied to the article 14a, 14b based on the interrogation.

The system of the present disclosure may additionally include one or more sensors to sense or gather data pertaining to the surrounding environment or operation of the system. Some exemplary sensors capable of being electronically coupled with the system (either directly connected to the system or remotely connected thereto) may include but are not limited to accelerometers sensing accelerations experienced during translation, velocity/speed, location traveled, photo/light sensors. The system may include wireless communication logic coupled to sensors on the system. The sensors gather data and provide the data to the wireless communication logic. Then, the wireless communication logic may transmit the data gathered from the sensors to a remote device. Thus, the wireless communication logic may be part of a broader communication system, in which one or several devices, assemblies, or systems of the present disclosure may be networked together to report alerts and, more generally, to be accessed and controlled remotely. Depending on the types of transceivers installed in the system, the system may use a variety of protocols (e.g., Wi-Fi®, Zig-Bee®, MIWI, BLUETOOTH®) for communication. In one example, each of the devices, assemblies, or systems of the present disclosure may have its own IP address and may communicate directly with a router or gateway. This would typically be the case if the communication protocol is Wi-Fi®. (Wi-Fi® is a registered trademark of Wi-Fi Alliance of Austin, TX, USA; ZigBee® is a registered trademark of ZigBee Alliance of Davis, CA, USA; and BLUETOOTH® is a registered trademark of Bluetooth Sig, Inc. of Kirkland, WA, USA). In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Unless explicitly stated that a particular shape or configuration of a component is mandatory, any of the elements, components, or structures discussed herein may take the form of any shape. Thus, although the figures depict the various elements, components, or structures of the present disclosure according to one or more exemplary embodiments, it is to be understood that any other geometric configuration of that element, component, or structure is entirely possible.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any flowchart and/or block diagrams in the Figures illustrate some exemplary architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, firmware or a combination thereof. When implemented in software, the software code or instructions can be executed on any suitable processor or collection of processors, whether provided in a single computer or distributed among multiple computers or in firmware. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that are executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

More particularly, the system of the present disclosure, which may include the logic(s) presented herein, includes the features, components, techniques or processes detailed herein that, as combined, accomplished the desired results detailed herein. These specific elements, configuration or techniques of the system of the present disclosure, some of which may be included in at least one of the appended claims, accomplish these desired results to overcome the then existing problems in the relevant field of computer processor-based systems. Additionally, the features, components, techniques or processes of the system of the present disclosure, are an unconventional arrangement of elements or unconventionally perform a method detailed herein that was unavailable without the unconventional arrangement of elements. These exemplary, yet particular, arrangements provide an improvement over existing technologies that have failed to operate in the manner, and with the efficiency that is taught by the system of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to "A" only (optionally including elements other than B); in another embodiment, to "B" only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present disclosure.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments. Furthermore, the use of any and all examples or exemplary language ("e.g.," "such as," or the like) is intended merely to better illustrate or illuminate the embodiments and does not pose a limitation on the scope of that or those embodiments. No language in this specification should be construed as indicating any unclaimed element as essential to the practice of the disclosed embodiment.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element or "another" element, that does not preclude there being more than one of the additional element or the another element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein. Further, recitation of ranges of values herein are not intended to be limiting, referring instead individually to any and all values falling within that range, unless otherwise indicated herein, and each separate value within such range is incorporated into the specification as if it were individually recited herein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this speci- fication, or in the context of those sections, this term has been included as required by the formatting requirements of word document submissions (i.e., docx submissions) pursu- ant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the require- ment of the prior art because such terms are used for descriptive purposes and are intended to be broadly con- strued.

Moreover, the description and illustration of various embodiments of the disclosure are examples and the disclo- sure is not limited to the exact details shown or described.

What is claimed is:

1. A method of verifying whether a plurality of articles have correct RFID tags or barcode applied thereto compris- ing:

proviaing an article verification system including a reader, a trigger mechanism coupled with the reader, a user interface, and a controller coupled with the trigger mechanism and the reader and having a memory stored therein a database of information concerning the plu- rality of articles and programming configured to per- form a verification process and to control the trigger mechanism and the reader;

automatically calibrating the reader, by the programming, by setting a transmission power level of a transmitter of the reader to a predetermined maximum power level;

sequentially placing each article of the plurality of articles in a field of view of the trigger mechanism; and determining whether or not an RFID tag or a barcode are provided on each article of the plurality of articles based upon the programming.

2. The method as in claim 1, further comprising storing results of determining whether or not each article is provided with an RFID tag or a barcode in the database in the memory of the article verification system.

3. The method as in claim 1, wherein when each article placed in the field of view of the trigger mechanism includes an RFID tag or a barcode, the method further comprises:

reading the RFID tag or barcode with the reader.

4. The method as in claim 3, further comprising compar- ing information encoded to the RFID tag or barcode with information stored in the memory of the controller.

5. The method as in claim 4, further comprising recording, in the database stored in the memory, whether or not the encoded information matches stored information.

6. The method as in claim 5, further comprising generat- ing, via programming provided in the memory, a verification report of whether or not the encoded information matches stored information.

7. The method as in claim 6, further comprising shipping the plurality of articles with the verification report.

8. The method as in claim 7, further comprising generat- ing, via the programming provided in the memory, a veri- fication report which includes a set of articles from the plurality of articles in which an RFID tag or barcode is applied thereto and in which encoded information on the applied RFID tag or barcode matches information stored in the memory of the controller.

9. The method as in claim 5, further comprising removing any article from the plurality of articles in which the encoded information on the RFID tag and or barcode applied to that article does not match the information stored in the memory.

10. The method as in claim 9, further comprising shipping the set of articles to a customer with the verification report.

11. The method as in claim 1, wherein the reader is a RFID reader and the transmitter is a RFID transmitter.

* * * * *